US011623341B2

(12) United States Patent
Son et al.

(10) Patent No.: US 11,623,341 B2
(45) Date of Patent: Apr. 11, 2023

(54) ROBOTIC WHEELCHAIR

(71) Applicant: LG ELECTRONICS INC., Seoul (KR)

(72) Inventors: Jungkyu Son, Seoul (KR); Jinsu Kim, Seoul (KR); Boyeon Kim, Seoul (KR); Hyesun Lee, Seoul (KR); Bina Kim, Seoul (KR); Mina Suh, Seoul (KR); Jinwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 468 days.

(21) Appl. No.: 16/828,442

(22) Filed: Mar. 24, 2020

(65) Prior Publication Data
US 2021/0146528 A1  May 20, 2021

(30) Foreign Application Priority Data
Nov. 18, 2019  (KR) .................. 10-2019-0147704

(51) Int. Cl.
*A61G 5/04* (2013.01)
*A61G 5/12* (2006.01)
*B25J 9/10* (2006.01)
*B25J 5/00* (2006.01)
*B25J 9/00* (2006.01)

(52) U.S. Cl.
CPC .............. *B25J 9/1035* (2013.01); *A61G 5/04* (2013.01); *A61G 5/125* (2016.11); *A61G 5/128* (2016.11); *B25J 5/007* (2013.01); *B25J 9/0009* (2013.01)

(58) Field of Classification Search
CPC ...... A47C 1/0307; A47C 7/541; A61G 5/124; A61G 5/1067; B60N 2/773; B64D 11/0644
See application file for complete search history.

(56) References Cited

U.S. PATENT DOCUMENTS

| | | | | |
|---|---|---|---|---|
| 4,887,866 | A * | 12/1989 | Rusin ...................... | A47C 1/03 297/411.44 |
| 5,407,249 | A * | 4/1995 | Bonutti .................. | A47C 16/00 297/411.35 |
| 5,536,070 | A * | 7/1996 | Lemmen ................ | A47C 7/541 297/411.36 |
| 6,520,587 | B2 * | 2/2003 | Noiseux ................ | A61G 15/12 297/411.39 |
| 9,050,227 | B1 * | 6/2015 | Hargroder .............. | A61G 5/125 |
| 9,907,402 | B2 * | 3/2018 | Alvarez ............... | A47C 1/0308 |

(Continued)

FOREIGN PATENT DOCUMENTS

| | | | | |
|---|---|---|---|---|
| EP | 0820749 | A1 * | 1/1998 | .......... A61G 5/1051 |
| EP | 2721964 | B1 * | 5/2017 | .............. A47C 1/03 |

(Continued)

*Primary Examiner* — Emma K Frick
(74) *Attorney, Agent, or Firm* — Birch, Stewart, Kolasch & Birch, LLP

(57) ABSTRACT

Provided is a robot. The robot includes a main body provided with a traveling wheel, a seat base coupled to an upper portion of the main body, a seat pad configured to cover the seat base at an upper side of the seat base, a pair of arm supporters connected to both sides of the seat base, respectively, and a pair of moving mechanisms disposed between the seat base and the seat pad, the pair of moving mechanisms being configured to allow the pair of arm supporters to move forward and backward.

18 Claims, 30 Drawing Sheets

(56) References Cited

U.S. PATENT DOCUMENTS 11,045,003 B2 *   6/2021   Fietz .................... A47C 1/0307
2009/0102157 A1 *   4/2009   Sanchez Lopez ..... A61G 5/023
                                                                    280/250.1

FOREIGN PATENT DOCUMENTS

| KR | 200176249 Y1 * | 8/2000 | ........... A47C 1/0307 |
| KR | 100884928 B1 * | 2/2009 | ............. A63B 23/12 |
| KR | 20180042633 A * | 4/2018 | ............... B60R 7/04 |

* cited by examiner

ROBOTIC WHEELCHAIR

CROSS-REFERENCE TO RELATED APPLICATIONS

The present application claims priority under 35 U.S.C. 119 and 35 U.S.C. 365 to Korean Patent Application No. 10-2019-0147704 (filed on Nov. 18, 2019), which is hereby incorporated by reference in its entirety.

BACKGROUND

The present disclosure relates to a robot on which a person is capable of being seated.

Robots have been developed for industrial use in order to be part of factory automation. In recent years, fields of application of the robots have been expanded, and thus, robots that are used in everyday life as well as medical robots and aerospace robots are being developed.

Such a robot for the daily life provides specific services (e.g., shopping, serving, talking, cleaning, etc.) in response to a user's command.

However, since the existing robots for the daily life are designed to provide only a specific service, there is a limitation that cost-effective utilization of the robots is not high.

As a result, in recent years, there is a need for robots capable of providing various services.

SUMMARY

Embodiments provide a robotic wheelchair (also referred to herein as a robot) in which an arm supporter moves forward and backward.

In a robot according to an embodiment, an arm supporter may move forward and backward by a moving mechanism disposed between a seat base and a seat pad.

In one embodiment, a robot includes: a main body provided with a traveling wheel; a seat base coupled to an upper portion of the main body; a seat pad configured to cover the seat base at an upper side of the seat base; a pair of arm supporters connected to both sides of the seat base, respectively; and a pair of moving mechanisms disposed between the seat base and the seat pad, the pair of moving mechanisms being configured to allow the pair of arm supporters to move forward and backward.

Each of the moving mechanisms may include: a motor; a pinion connected to the motor; a rack engaged with the pinion; and a coupling body coupled to each of the arm supporters, the coupling body being configured to move in a longitudinal direction of the rack together with the motor and the pinion.

The motor may be connected to the pinion by passing through the coupling body.

A left-right distance between the rack of one moving mechanism and the rack of the other moving mechanism may gradually decrease forward.

The rack of one moving mechanism and the rack of the other moving mechanism may be symmetrical to each other in a left-right direction.

The moving mechanism may further include: an inner rail configured to support an inner end of the coupling body; and an outer rail parallelly spaced apart from the inner rail, the outer rail being configured to support an outer end of the coupling body.

The motor may be disposed between the inner rail and the outer rail in a horizontal direction.

The rack may be spaced upward from the inner rail, and the inner end of the coupling body may be disposed between the rack and the inner rail in a vertical direction.

A long hole through which each of the arm supporters passes may be defined in each of both sides of the seat base.

Each of the arm supporters may include: an armrest that is elongated forward and backward; an insertion portion inserted into the long hole; and a connection portion configured to connect the armrest to the insertion portion.

The seat base may include: a lower base inserted into the main body through the opening portion defined in a top surface of the main body; and an upper base which is connected to an upper portion of the lower base and is configured to cover the opening portion and in which a long hole through which the arm supporter passes is defined.

The robot may further include: a backrest connected to the seat; and a tilting mechanism embedded in the seat, the tilting mechanism being configured to tilt the backrest with respect to the seat. A recess space in which the tilting mechanism is accommodated may be defined in the seat, and the pair of moving mechanisms may be symmetrical to each other in a left-right direction with respect to the recess space.

The moving mechanism may be configured to allow each of the arm supporters to move between a first position and a second position that is disposed behind the first position, and a left-right distance between the pair of arm supporters that are disposed at the first positions may be less than a left-right distance between the pair of arm supporters that are disposed at the second positions.

The details of one or more embodiments are set forth in the accompanying drawings and the description below. Other features will be apparent from the description and drawings, and from the claims.

DETAILED DESCRIPTION OF THE EMBODIMENTS

Figure 1:
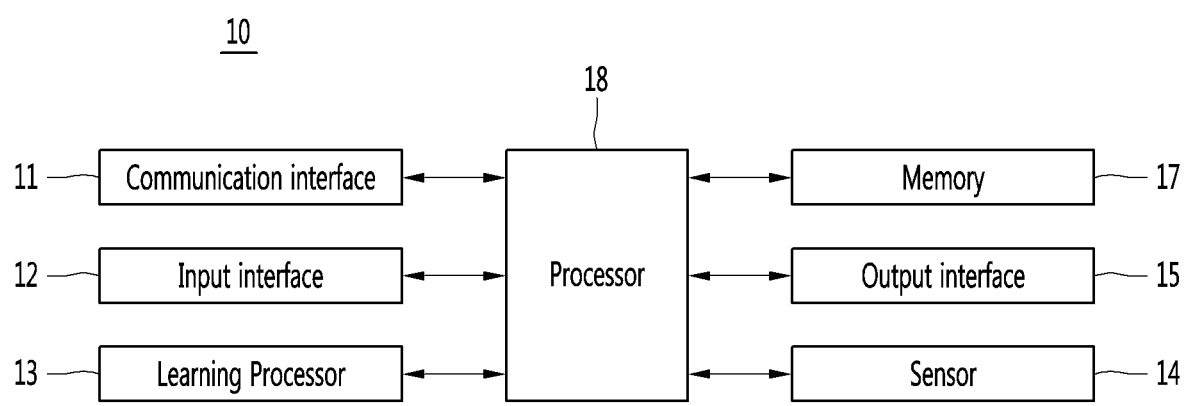
FIG. 1 illustrates an AI device including a robot according to an embodiment.

Hereinafter, detailed embodiments will be described in detail with reference to the accompanying drawings.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network may be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 10 including a robot according to an embodiment of the present disclosure.

The AI device 10 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 10 may include a communication interface 11, an input interface 12, a learning processor 13, a sensor 14, an output interface 15, a memory 17, and a processor 18.

The communication interface 11 may transmit and receive data to and from external devices such as other AI devices 10a to 10e and the AI server 20 by using wire/wireless communication technology. For example, the communication interface 11 may transmit and receive sensor information, a user input, a learning model, and a control signal to and from external devices.

The communication technology used by the communication interface 11 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 12 may acquire various kinds of data.

At this time, the input interface 12 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 12 may acquire a learning data for model learning and an input data to be used when an output is acquired by using learning model. The input interface 12 may acquire raw input data. In this case, the processor 18 or the learning processor 13 may extract an input feature by preprocessing the input data.

The learning processor 13 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 13 may perform AI processing together with the learning processor 24 of the AI server 20.

At this time, the learning processor 13 may include a memory integrated or implemented in the AI device 10. Alternatively, the learning processor 13 may be implemented by using the memory 17, an external memory directly connected to the AI device 10, or a memory held in an external device.

The sensor 14 may acquire at least one of internal information about the AI device 10, ambient environment information about the AI device 10, and user information by using various sensors.

Examples of the sensors included in the sensor 14 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 15 may generate an output related to a visual sense, an auditory sense, or a haptic sense.

At this time, the output interface 15 may include a display unit for outputting time information, a speaker for outputting auditory information, and a haptic module for outputting haptic information.

The memory 17 may store data that supports various functions of the AI device 10. For example, the memory 17 may store input data acquired by the input interface 12, learning data, a learning model, a learning history, and the like.

The processor 18 may determine at least one executable operation of the AI device 10 based on information determined or generated by using a data analysis algorithm or a machine learning algorithm. The processor 18 may control the components of the AI device 10 to execute the determined operation.

To this end, the processor 18 may request, search, receive, or utilize data of the learning processor 13 or the memory 17. The processor 18 may control the components of the AI device 10 to execute the predicted operation or the operation determined to be desirable among the at least one executable operation.

When the connection of an external device is required to perform the determined operation, the processor 18 may generate a control signal for controlling the external device and may transmit the generated control signal to the external device.

The processor 18 may acquire intention information for the user input and may determine the user's requirements based on the acquired intention information.

The processor 18 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 13, may be learned by the learning processor 24 of the AI server 20, or may be learned by their distributed processing.

The processor 18 may collect history information including the operation contents of the AI device 100 or the user's feedback on the operation and may store the collected history information in the memory 17 or the learning processor 13 or transmit the collected history information to the external device such as the AI server 20. The collected history information may be used to update the learning model.

The processor 18 may control at least part of the components of AI device 10 so as to drive an application program stored in memory 17. Furthermore, the processor 18 may operate two or more of the components included in the AI device 10 in combination so as to drive the application program.

Figure 2:
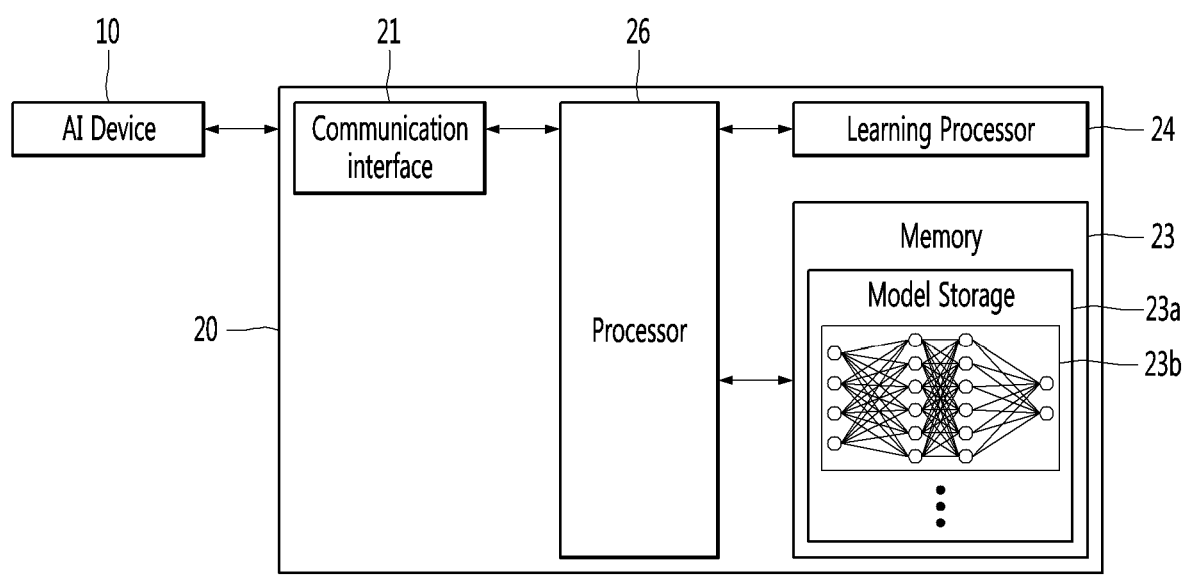
FIG. 2 illustrates an AI server connected to a robot according to an embodiment.

FIG. 2 illustrates an AI server 20 connected to a robot according to an embodiment of the present disclosure.

Referring to FIG. 2, the AI server 20 may refer to a device that learns an artificial neural network by using a machine learning algorithm or uses a learned artificial neural network. The AI server 20 may include a plurality of servers to perform distributed processing, or may be defined as a 5G network. At this time, the AI server 20 may be included as a partial configuration of the AI device 10, and may perform at least part of the AI processing together.

The AI server 20 may include a communication interface 21, a memory 23, a learning processor 24, a processor 26, and the like.

The communication interface 21 can transmit and receive data to and from an external device such as the AI device 10.

The memory 23 may include a model storage 23a. The model storage 23a may store a learning or learned model (or an artificial neural network 23b) through the learning processor 24.

The learning processor 24 may learn the artificial neural network 23b by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in memory 23.

The processor 26 may infer the result value for new input data by using the learning model and may generate a response or a control command based on the inferred result value.

Figure 3:
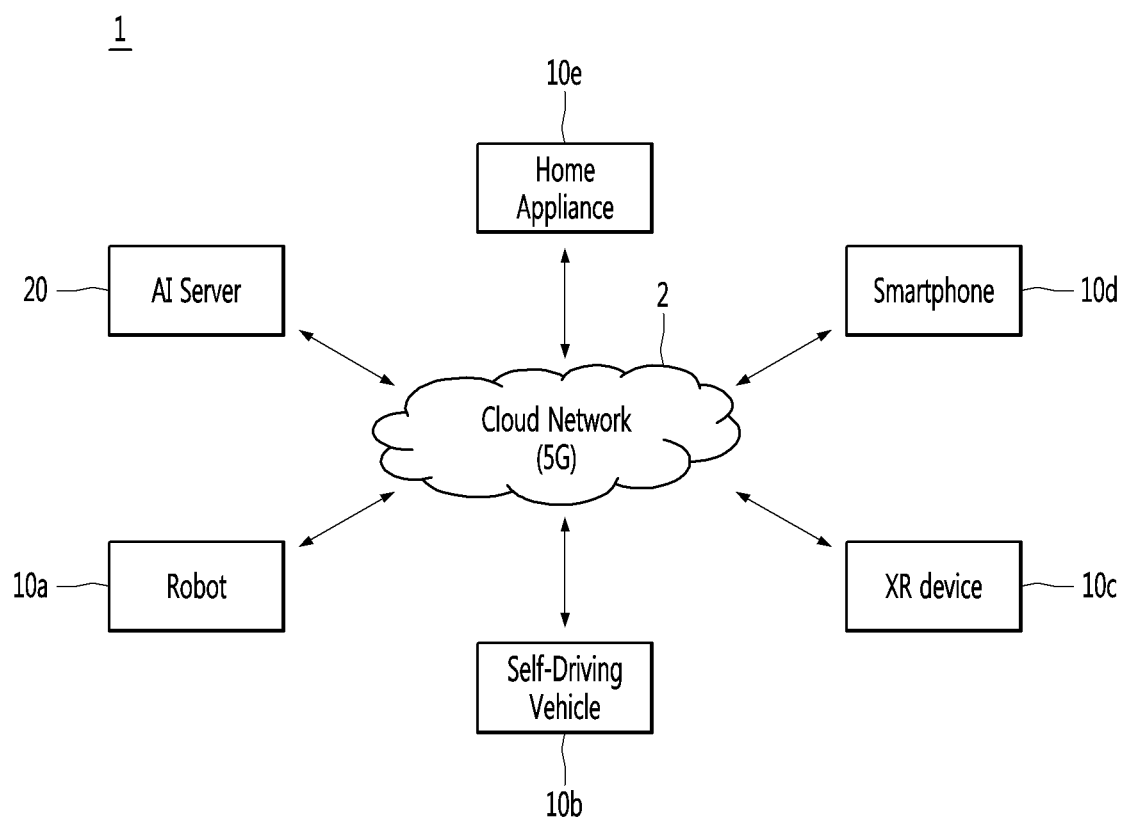
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 20, a robot 10a, a self-driving vehicle 10b, an XR device 10c, a smartphone 10d, or a home appliance 10e is connected to a cloud network 10. The robot 10a, the self-driving vehicle 10b, the XR device 10c, the smartphone 10d, or the home appliance 10e, to which the AI technology is applied, may be referred to as AI devices 10a to 10e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 10a to 10e and 20 configuring the AI system 1 may be connected to each other through the cloud network 10. In particular, each of the devices 10a to 10e and 20 may communicate with each other through a base station, but may directly communicate with each other without using a base station.

The AI server 20 may include a server that performs AI processing and a server that performs operations on big data.

The AI server 20 may be connected to at least one of the AI devices constituting the AI system 1, that is, the robot 10a, the self-driving vehicle 10b, the XR device 10c, the smartphone 10d, or the home appliance 10e through the cloud network 10, and may assist at least part of AI processing of the connected AI devices 10a to 10e.

At this time, the AI server 20 may learn the artificial neural network according to the machine learning algorithm instead of the AI devices 10a to 10e, and may directly store the learning model or transmit the learning model to the AI devices 10a to 10e.

At this time, the AI server 20 may receive input data from the AI devices 10a to 10e, may infer the result value for the received input data by using the learning model, may generate a response or a control command based on the inferred result value, and may transmit the response or the control command to the AI devices 10a to 10e.

Alternatively, the AI devices 10a to 10e may infer the result value for the input data by directly using the learning model, and may generate the response or the control command based on the inference result.

Hereinafter, various embodiments of the AI devices 10a to 10e to which the above-described technology is applied will be described. The AI devices 10a to 10e illustrated in FIG. 3 may be regarded as a specific embodiment of the AI device 10 illustrated in FIG. 1.

<AI+Robot>

The robot 10a, to which the AI technology is applied, may be implemented as a guide robot, a carrying robot, a cleaning robot, a wearable robot, an entertainment robot, a pet robot, an unmanned flying robot, or the like.

The robot 10a may include a robot control module for controlling the operation, and the robot control module may refer to a software module or a chip implementing the software module by hardware.

The robot 10a may acquire state information about the robot 10a by using sensor information acquired from various kinds of sensors, may detect (recognize) surrounding environment and objects, may generate map data, may determine the route and the travel plan, may determine the response to user interaction, or may determine the operation.

The robot 10a may use the sensor information acquired from at least one sensor among the lidar, the radar, and the camera so as to determine the travel route and the travel plan.

The robot 10a may perform the above-described operations by using the learning model composed of at least one artificial neural network. For example, the robot 10a may recognize the surrounding environment and the objects by using the learning model, and may determine the operation by using the recognized surrounding information or object information. The learning model may be learned directly from the robot 10a or may be learned from an external device such as the AI server 20.

At this time, the robot 10a may perform the operation by generating the result by directly using the learning model, but the sensor information may be transmitted to the external device such as the AI server 20 and the generated result may be received to perform the operation.

The robot 10a may use at least one of the map data, the object information detected from the sensor information, or the object information acquired from the external apparatus to determine the travel route and the travel plan, and may control the driving unit such that the robot 10a travels along the determined travel route and travel plan.

The map data may include object identification information about various objects arranged in the space in which the robot 10a moves. For example, the map data may include object identification information about fixed objects such as walls and doors and movable objects such as pollen and desks. The object identification information may include a name, a type, a distance, and a position.

In addition, the robot 10a may perform the operation or travel by controlling the driving unit based on the control/interaction of the user. At this time, the robot 10a may acquire the intention information of the interaction due to the user's operation or speech utterance, and may determine the response based on the acquired intention information, and may perform the operation.

<AI+Robot+Self-Driving>

The robot 10a, to which the AI technology and the self-driving technology are applied, may be implemented as a guide robot, a carrying robot, a cleaning robot, a wearable robot, an entertainment robot, a pet robot, an unmanned flying robot, or the like.

The robot 10a, to which the AI technology and the self-driving technology are applied, may refer to the robot itself having the self-driving function or the robot 10a interacting with the self-driving vehicle 10b.

The robot 10a having the self-driving function may collectively refer to a device that moves for itself along the given movement line without the user's control or moves for itself by determining the movement line by itself.

The robot 10a and the self-driving vehicle 10b having the self-driving function may use a common sensing method so as to determine at least one of the travel route or the travel plan. For example, the robot 10a and the self-driving vehicle 10b having the self-driving function may determine at least one of the travel route or the travel plan by using the information sensed through the lidar, the radar, and the camera.

The robot 10a that interacts with the self-driving vehicle 10b exists separately from the self-driving vehicle 10b and may perform operations interworking with the self-driving function of the self-driving vehicle 10b or interworking with the user who rides on the self-driving vehicle 10b.

At this time, the robot 10a interacting with the self-driving vehicle 10b may control or assist the self-driving function of the self-driving vehicle 10b by acquiring sensor information on behalf of the self-driving vehicle 10b and providing the sensor information to the self-driving vehicle 10b, or by acquiring sensor information, generating environment information or object information, and providing the information to the self-driving vehicle 10b.

Alternatively, the robot 10a interacting with the self-driving vehicle 10b may monitor the user boarding the self-driving vehicle 10b, or may control the function of the self-driving vehicle 10b through the interaction with the user. For example, when it is determined that the driver is in a drowsy state, the robot 10a may activate the self-driving function of the self-driving vehicle 10b or assist the control of the driving unit of the self-driving vehicle 10b. The function of the self-driving vehicle 10b controlled by the robot 10a may include not only the self-driving function but also the function provided by the navigation system or the audio system provided in the self-driving vehicle 10b.

Alternatively, the robot 10a that interacts with the self-driving vehicle 10b may provide information or assist the function to the self-driving vehicle 10b outside the self-driving vehicle 10b. For example, the robot 10a may provide traffic information including signal information and the like, such as a smart signal, to the self-driving vehicle 10b, and automatically connect an electric charger to a charging port by interacting with the self-driving vehicle 10b like an automatic electric charger of an electric vehicle.

Figure 4:
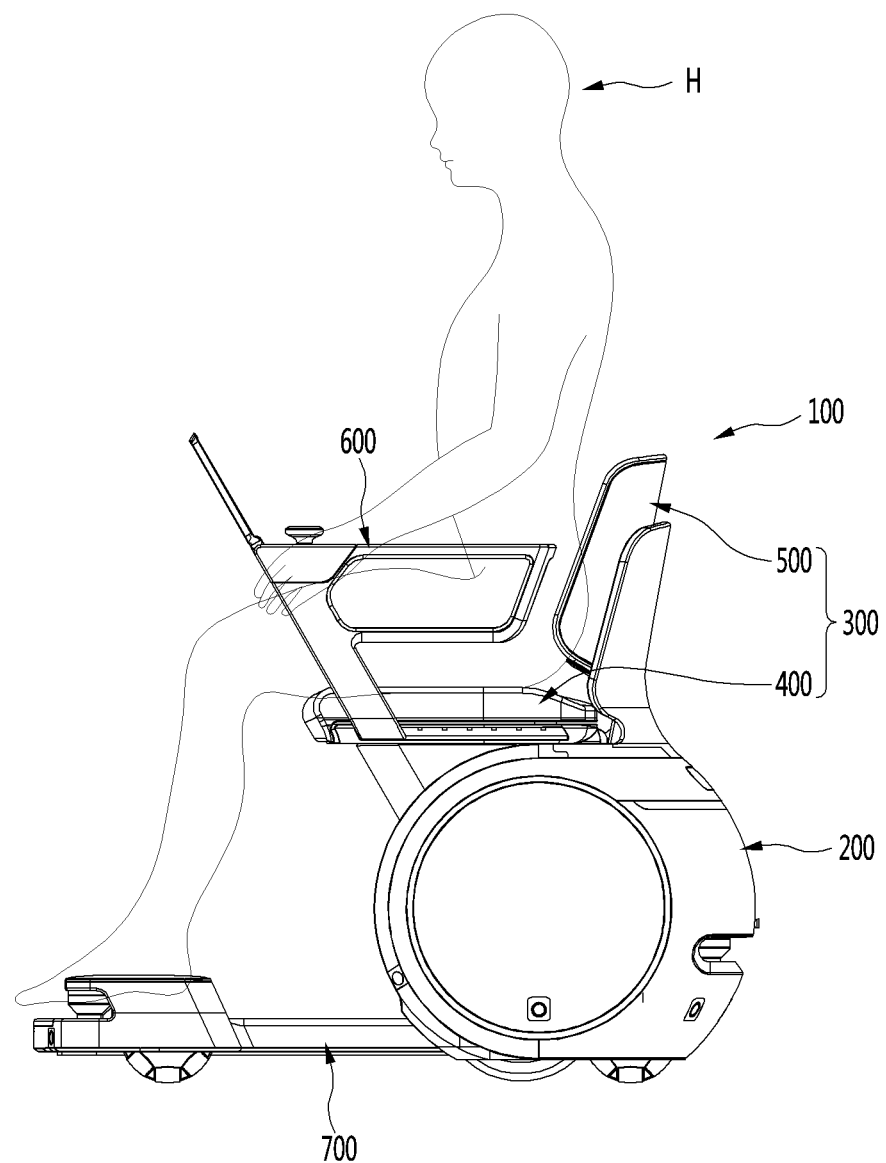
FIG. 4 illustrates a state in which a user rides on a robot according to an embodiment.

FIG. 4 illustrates a state in which a user rides on a robot according to an embodiment.

A robot 100 according to the embodiment may mean the robot 10a described above.

The robot 100 may include a main body 200, a seating body 300, an arm supporter 600, and a foot supporter 700.

The main body 200 may include at least one traveling wheel and may be a traveling module or a mobile robot, which is capable of traveling according to an input of a user H.

The main body 200 may be a combination of a plurality of components. The main body 200 may be provided with a traveling mechanism connected to the traveling wheel to allow the traveling wheel to rotate forward or reverse. Also, a battery may be embedded in the main body 200.

The seating body 300 may be disposed above the main body 200. The main body 200 may support the seating body 300. The user H may be seated on the seating body 300, and thus, the user H may ride on the robot 100.

The seating body 300 may include a seat 400 and a backrest 500. The seat 400 may support the buttocks of the user H, and the backrest 500 may support the back and/or waist of the user H.

The seat 400 may be disposed substantially horizontally. The seat 400 may cover a top surface of the main body 200.

The backrest 500 may be disposed vertically or inclined in a direction in which a height increases toward a rear side. The backrest 500 may be connected to the seat 400. In more detail, the backrest 500 may be connected to a rear end of the seat 400.

A pair of arm supporters 600 may be connected to both sides of the seat 400. The user H may place the arm on the arm supporter 600. The pair of arm supporters 600 may be spaced apart from each other in a left-right direction and may be symmetrical to each other in the left-right direction.

The foot supporter 700 may be connected to the main body 200. The foot supporter 700 may protrude forward from a lower portion of the main body 200. The foot supporter 700 may be disposed approximately horizontally. The user H may place the foot on the foot supporter 700.

The foot supporter 700 may be provided with an auxiliary wheel for supporting the foot supporter 700. Therefore, the robot 100 may travel stably without being tilted forward or overturning.

Figure 5:
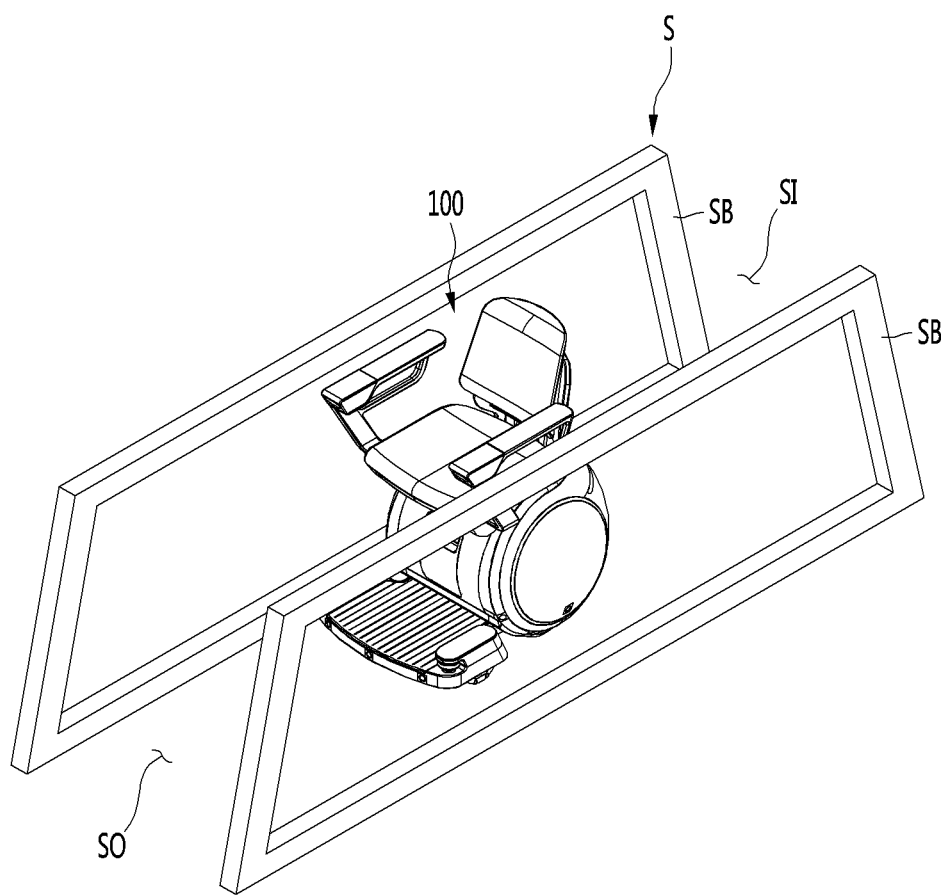
FIG. 5 illustrates a state in which the robot is disposed in a charging station according to an embodiment.

FIG. 5 illustrates a state in which the robot is disposed in a charging station according to an embodiment.

The robot 100 according to this embodiment may be stored in a charging station S when the user H does not ride. In more detail, the robot 100 may autonomously travel to move to the charging station S at a predetermined position when the user H does not ride.

The charging station S may wirelessly charge the robot 100. In more detail, the charging station S may wirelessly charge the battery of the robot 100. Thus, the robot stored in the charging station S may be automatically charged.

Also, the charging station S may sterilize the robot. For example, the charging station S may irradiate the robot 100 with ultraviolet rays or inject a sterilizing solution. In more detail, the charging station S may irradiate the seating body 300 with ultraviolet rays or spray a sterilizing solution. Thus, the seating body 300 of the robot 100 may be maintained in a clean state.

The charging station S includes a pair of station bodies SB spaced apart from each other, a station inlet SI through which the robot 100 enters between a pair of station bodies SB, and a station outlet SO through which the robot 100 exits between the pair of station bodies SB.

For example, the pair of station bodies SB may be elongated in the front-rear direction and be spaced apart from each other in the left-right direction. The station inlet SI may be disposed between the rear ends of the pair of station bodies SB, and the station outlet SO may be disposed between front ends of the pair of station bodies SB.

The robot 100 on which the user H does not ride may enter the charging station S through the station inlet SI and then may be waited, charged, and sterilized between the pair of station bodies SB.

The user H may call the robot 100, which is waiting at the charging station S, to a set position through wired or wireless communication. The robot 100 may exit from the charging station S through the station outlet SO and may autonomously travel to the set position.

A plurality of robots 100 may be stored between the pair of station bodies SB. The plurality of robots 100 may be arranged in line in the front-rear direction. When the user H calls the robot 100 to the set position through the wired or wireless communication, the robot 100 that is closest to the station outlet SO among the plurality of robots 100 may autonomously travel to the set position.

Figure 6:
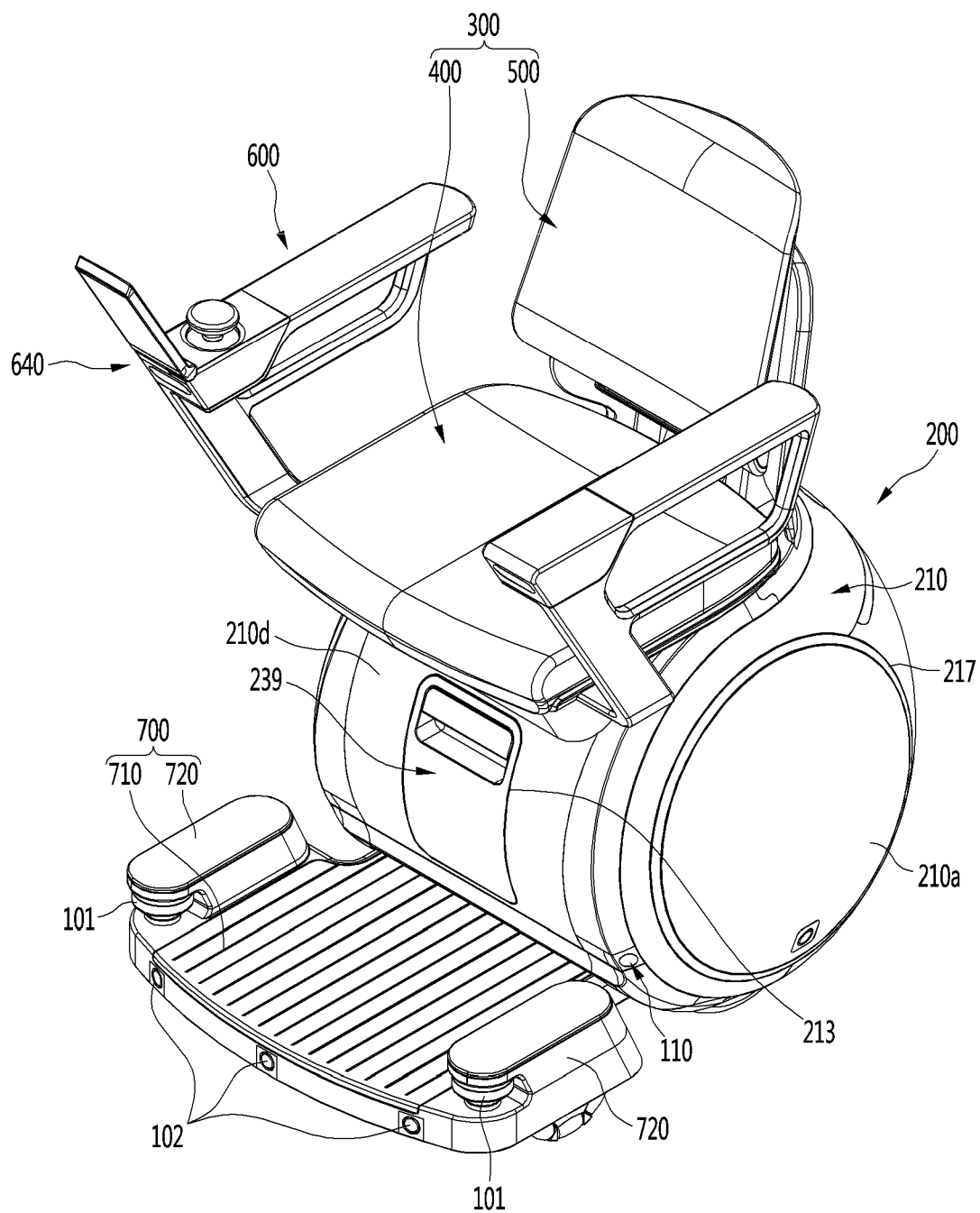
FIG. 6 illustrates a perspective view of the robot according to an embodiment.
Figure 7:
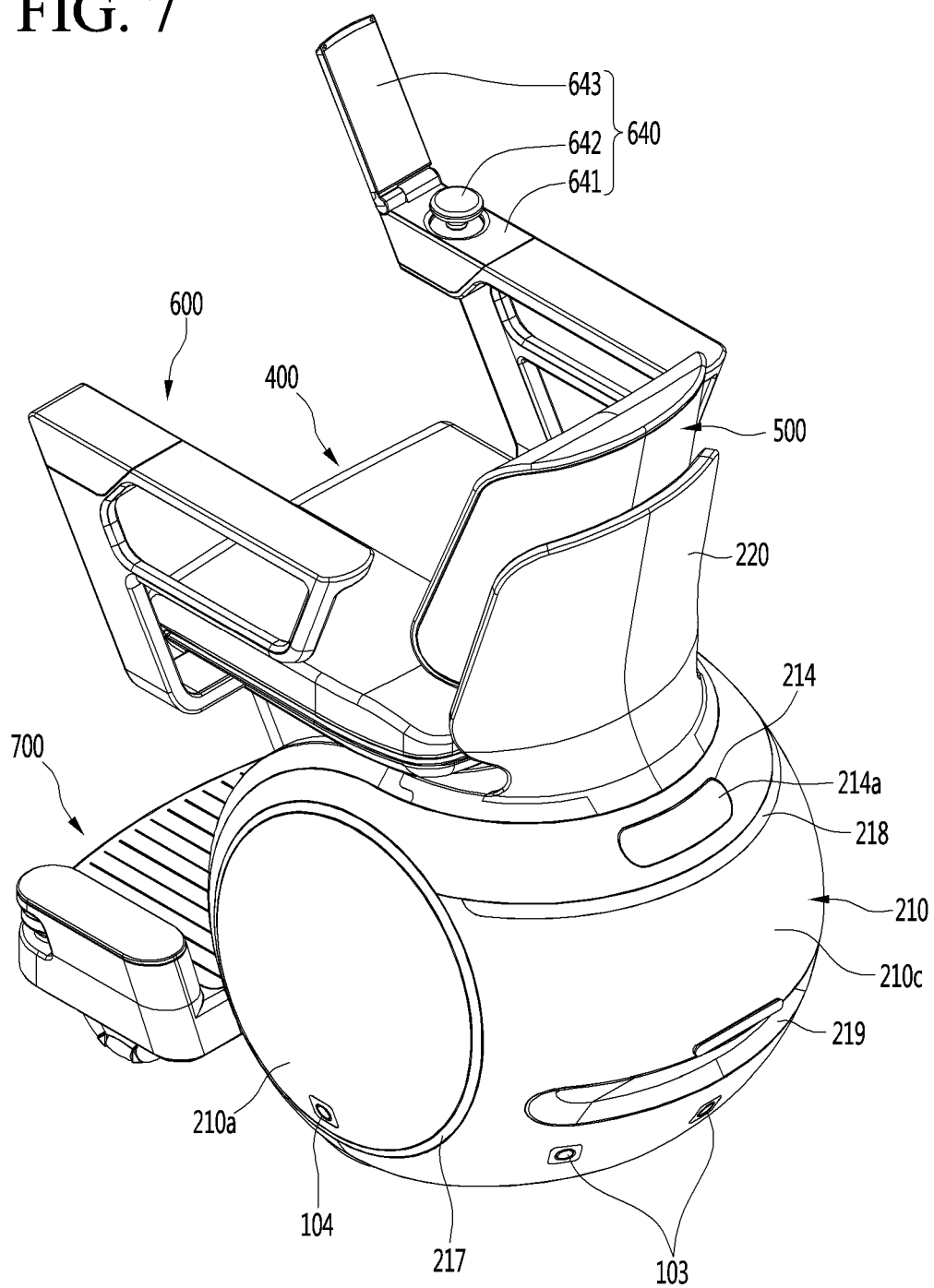
FIG. 7 illustrates a perspective view of the robot of FIG. 6 when viewed in various directions.
Figure 8:
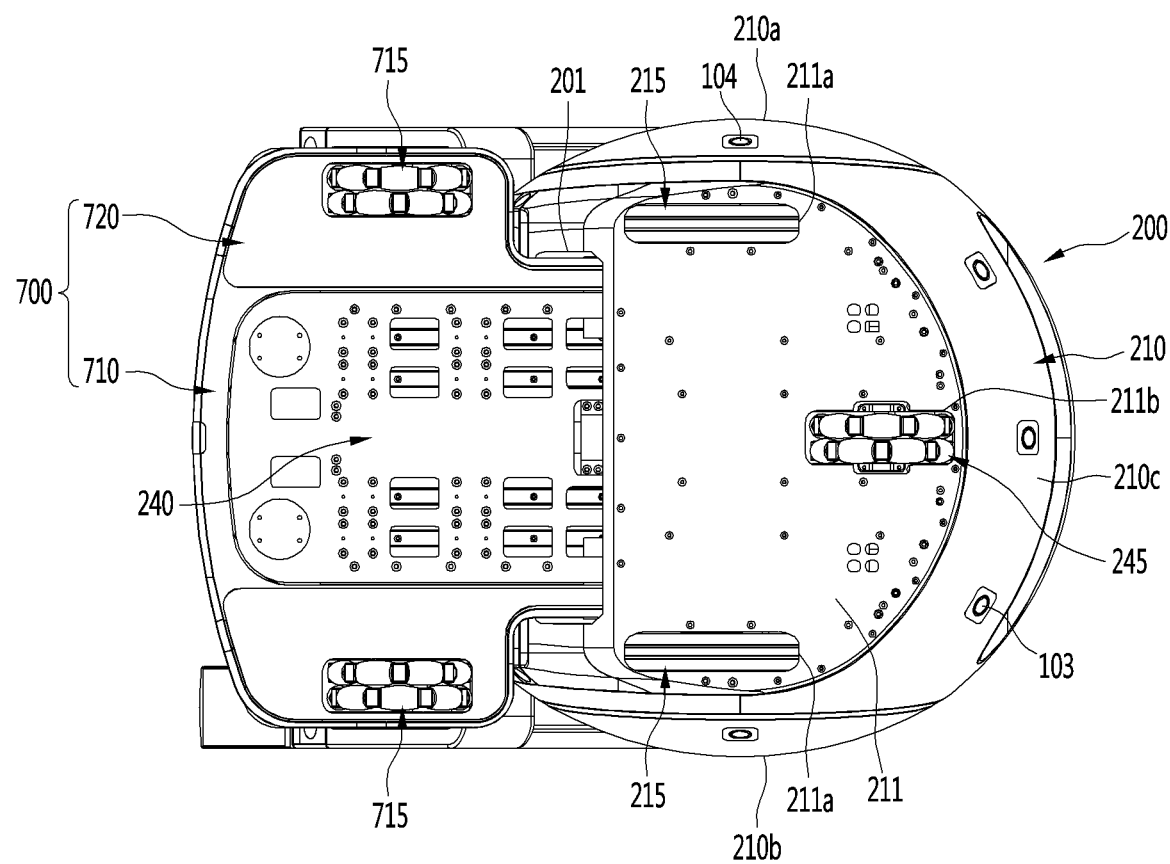
FIG. 8 illustrates a bottom view of the robot according to an embodiment.
Figure 9:
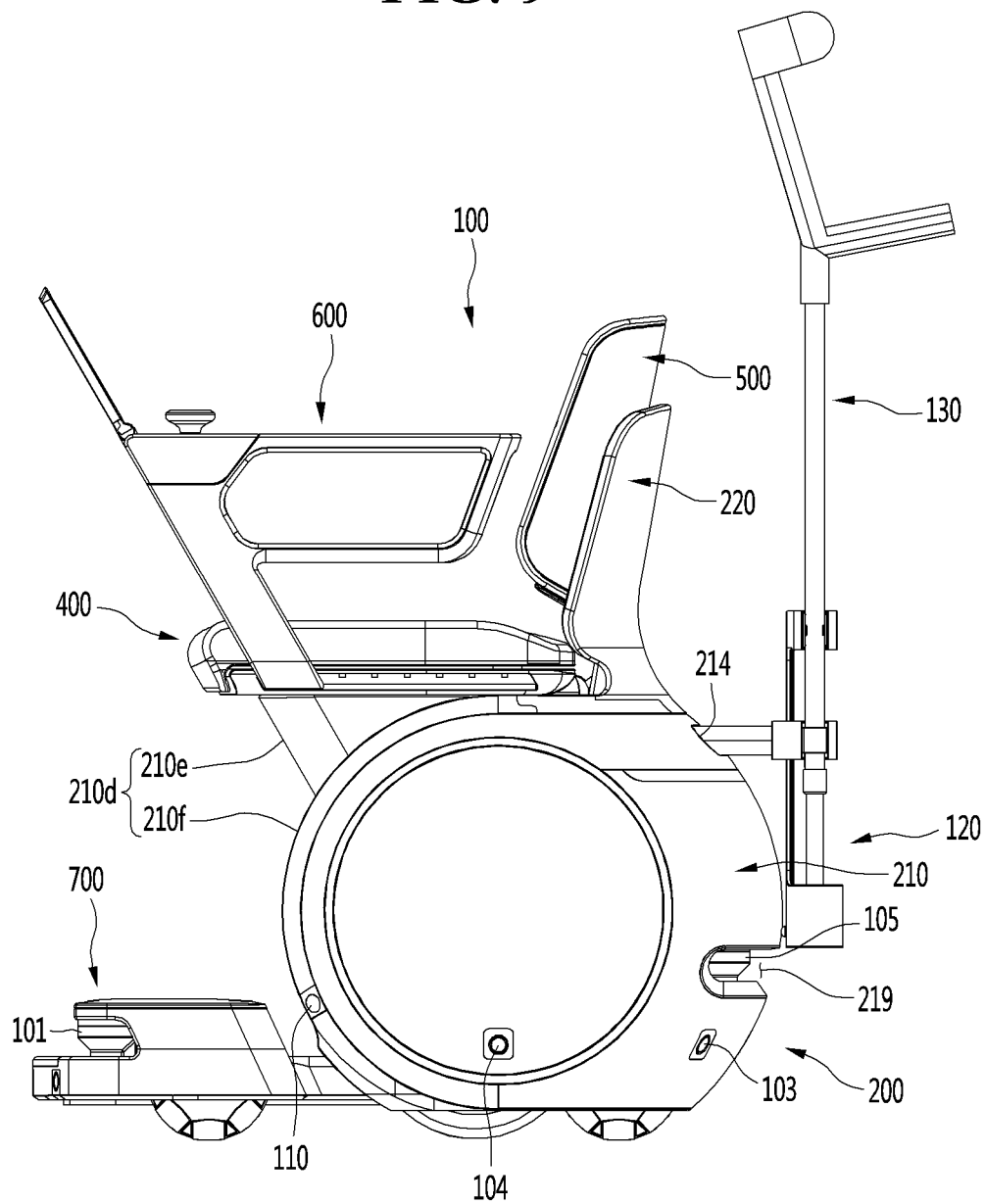
FIG. 9 illustrates a state in which an accessory is mounted on the robot according to an embodiment.

FIG. 6 illustrates a perspective view of the robot according to an embodiment, FIG. 7 illustrates a perspective view of the robot of FIG. 6 when viewed in various directions, FIG. 8 illustrates a bottom view of the robot according to an embodiment, and FIG. 9 illustrates a state in which an accessory is mounted on the robot according to an embodiment.

The main body 200 of the robot 100 may include a housing 210 and a lower cover 211. The housing 210 and the lower cover 211 may define an appearance of the main body 200.

The housing 210 may define a circumferential surface of the main body 200. The housing 210 may have an inner space. The housing 210 may be provided as a combination of a plurality of members.

The housing 210 may have a streamlined shape. The circumferential surface of the housing 210 may be curved.

In more detail, a left side surface 210a of the housing 210 may be convex to a left side, and a right side surface 210b of the housing 210 may be convex to a right side. A rear surface 210c of the housing 210 may be convex backward between an upper end and a rear end thereof. A front surface 210d of the housing 210 may include a tilted surface 210e and a curved surface 210f. The tilted surface 210e may be tilted backward toward a lower side. The curved surface 210f may be connected to a lower end of the tilted surface 210e. The curved surface 210f may be convex forward between an upper end and a lower end thereof.

A bottom surface of the housing 210 may be opened. The lower cover 211 may cover the opened bottom surface of the housing 210.

The lower cover 211 may define the bottom surface of the main body 200. The lower cover 211 may be disposed horizontally.

The main body 200 may be provided with a traveling wheel 215 for the traveling of the robot 100. The traveling wheel 215 may be rotatably connected to the housing 210. The traveling wheel 215 may be provided in a pair that are spaced apart from each other in the left-right direction.

The main body 200 may include a pair of driving mechanisms (not shown) for allowing the pair of traveling wheels 215 to rotate respectively. The driving mechanism may allow the traveling wheel 215 to rotate forward or reverse.

The driving mechanism may include a traveling motor generating driving force for the rotation of the traveling wheel 215. For example, the travel motor may be directly connected to the travel wheel 215 and allow the travel wheel 215 to directly rotate. For another example, the traveling motor may be connected to the traveling wheel 215 through various power transmission members such as a rotation shaft, a gear, and the like, and the traveling wheel 215 may rotate through the power transmission member.

The traveling wheel 215 may protrude downward from the bottom surface of the main body 200. The traveling wheel 215 may protrude downward from the lower cover 211. A traveling wheel through-hole 211a through which the traveling wheel 215 passes may be defined in the lower cover 211. Thus, when compared to a case in which the traveling wheel 215 is provided at both sides of the main body 200, the robot 100 has an advantage of being compact in the left-right direction.

The pair of traveling wheels 215 may rotate independently with respect to each other. A traveling direction of the robot 100 may be determined according to a rotation direction of each of the traveling wheels 215 and/or a difference in rotation speed between the pair of traveling wheels 215. However, this embodiment is not limited thereto, and a configuration in which the traveling wheel 215 and a separate steering wheel are provided in the main body may be also possible.

The main body 200 may be provided with an auxiliary wheel 245 to assist the traveling of the robot 100. The auxiliary wheel 245 may be spaced apart from the traveling wheel 215.

The auxiliary wheel 245 may include an omni wheel. Alternately, the auxiliary wheel 245 may include a caster.

The auxiliary wheel 245 may protrude downward from the bottom surface of the main body 200. The auxiliary wheel 245 may protrude downward from the lower cover 211. An auxiliary wheel through-hole 211b through which the auxiliary wheel 245 passes may be defined in the lower cover 211.

The auxiliary wheel 245 may be disposed between the pair of traveling wheels 215 or may face a space between the pair of traveling wheels 215 in the front-rear direction.

A battery 239 for supplying power to each component of the robot 100 may be mounted on the main body 200. The battery 239 may be disposed in the main body 200 in consideration of a center of gravity of the robot 100.

A battery insertion hole 213 into which the battery 239 is inserted may be defined in the front surface of the main body 200. That is, the battery insertion hole 213 may be defined in the front surface 210d of the housing 210. In more detail, the battery insertion hole 213 may be defined in the curved surface 210f.

Thus, the user may easily mount the battery 239 on the main body 200 through the battery insertion hole 213 or may be easily detached from the main body 200.

The main body 200 may be provided with sensors 103, 104, and 105 that detect a surrounding environment of the robot 100. The sensors 103, 104, and 105 may assist autonomous driving of the robot 100 so that the robot 100 does not collide with an obstacle or a person therearound.

The sensors 103 and 105 may include a rear lidar 105 and ultrasonic sensors 103 and 104.

The rear lidar 105 may be provided on the rear surface of the main body 200. The rear lidar 105 may be provided on the rear surface 210c of the housing 210. In more detail, a recess portion 219 in which the rear lidar 105 is disposed may be defined in the rear surface 210c of the housing 210. The recess portion 219 may be recessed horizontally forward from the rear surface of the housing 210c. The recess portion 219 may be lengthily defined in the left-right direction.

The ultrasonic sensors 103 and 104 may be provided in plurality, which are spaced apart from each other in the circumferential direction of the main body 200. The plurality of ultrasonic sensors 103 and 104 may be provided below the main body 200. The plurality of ultrasonic sensors 103 and 104 may be disposed at the same height as each other.

The plurality of ultrasonic sensors 103 and 104 may include a rear sensor 103 provided on the rear surface of the main body 200 and a side sensor 104 disposed on each of both side surfaces of the main body 200.

That is, the side sensor 104 may be provided at each of both side surfaces 210a and 210b of the housing 210, and the rear sensor 103 may be disposed at the rear surface 210c of the housing 210. The rear sensor 103 may be disposed at a height lower than the rear lidar 105.

The main body 200 may be provided with lights 217 and 218 for emitting light. The lights 217 and 218 may emit light having different colors or different patterns according to a state or traveling mode of the robot 100. Thus, people around the robot 100 may easily determine the state or traveling mode of the robot 100.

For example, in a riding mode in which the robot 100 travels in a state in which the user H rides, light having a first color (for example, a green color) may be emitted from the lights 217 and 218. In a return mode in which the robot 100, on which the user H does not ride, moves to the charging station S, light having a second color (for example, a red color) may be emitted from the lights 217 and 218. In a moving mode in which the robot 100, in which the user H does not ride, moves from the charging station S to the called position of the user H, light having a third color (for example, a yellow color) may be emitted from the lights 217 and 218.

The lights 217 and 218 may include side lights 217 provided on both sides 210a and 210b of the housing 210 and a backlight 218 provided on the rear surface 210c of the housing 210. Each of the side lights 217 may have a circular ring shape. The backlight 218 may be lengthily disposed in the left-right direction. The backlight 218 may extend from the rear surface 210c of the housing 210 to each of both side surfaces 210a and 210b.

An accessory insertion hole 214 in which an accessory 120 is mounted may be defined in the main body 200. For example, the accessory 120 may be a holder for mounting an object 130 such as crutches.

The accessory 120 may be inserted into the accessory insertion hole 214 and thus be mounted on the robot 100. The robot 100 may travel in the state in which the accessory 120 is mounted on the accessory insertion hole 214. As a result, the user H who rides on the robot 100 does not need to directly lift the object 130.

The accessory insertion hole 214 may be defined in the housing 210. In more detail, the accessory insertion hole 214 may be defined in the rear surface of the housing 210.

The accessory insertion hole 214 may be disposed above the recess portion 219 in which the rear lidar 105 is disposed. In order to smoothly perform an operation of the rear lidar 105, the accessory holder 120 or the accessory 130 mounted to the accessory insertion hole 214 may not cover the rear lidar 105.

The accessory insertion hole 214 may be covered by an accessory insertion hole cover 214a. The accessory insertion hole cover 214a may detachably cover the accessory insertion hole 214. The user may detach the accessory insertion hole cover 214a from the accessory insertion hole 214 and attach the accessory holder 120 or the accessory 130 to the accessory insertion hole 214.

The main body 200 may be provided with a projector 110 for projecting an image on the bottom surface.

The projector 110 may be provided in a pair, which are disposed on both sides of the main body 200, respectively. The pair of projectors 110 may be provided on both side surfaces 210a and 210b of the housing 210, respectively. The pair of projectors 110 may be adjacent to the front surface 210d of the housing 210, in particularly, the curved surface 210f. The pair of projectors 110 may be disposed to be symmetrical to each other.

The projector 110 may emit beams to both sides of the foot supporter 700. In more detail, the left projector 110 provided on the left side 210a of the housing 210 may emit light to a lower left side, and the light projector 110 provided on the right side 210b of the housing 210 may emit light to a lower right side.

The projector 110 may project an image on the floor surface. For example, the left projector 110 may project a left arrow on the floor surface before the robot 100 rotates to the left side. The light projector 110 may project a right arrow to the floor surface before the robot 100 rotates to the right side.

Thus, a people around the robot 100 may previously recognize the traveling direction of the robot 100 and may safely avoid a traveling path of the robot 100.

An opening 201 through which the foot supporter 700 passes may be defined in the front surface of the main body 200. The opening 201 may be defined between the front surface 210d of the housing 210 and the lower cover 211. In more detail, the opening 201 may be defined between a lower end of the curved surface 210f and a front end of the lower cover 211.

The foot supporter 700 may be elongated in the front and rear direction and may be disposed horizontally. The foot supporter 700 may protrude forward from the lower portion of the main body 200 through the opening 201. The foot supporter 700 may include a footrest 710 and a side body 720.

The footrest 710 may pass through the opening 201 of the main body 200. The footrest 710 may support the foot of the user H that rides on the robot 100.

The side body 720 may be connected to each of both sides of the footrest 710. In more detail, the side body 720 may be connected to each of both front sides of the footrest 710.

The side body 720 may be disposed outside the main body 200. The side body 720 may be provided in a pair, which are spaced apart from each other in the left-right direction. The side body 720 may protrude upward from the footrest 710.

The side body 720 may be disposed on each of both sides of the lower plate 240.

The foot supporter 700 may be provided with an auxiliary wheel 715. The auxiliary wheel 715 provided on the foot supporter 700 may be referred to as a front auxiliary wheel, and the auxiliary wheel 245 provided on the main body 200 may be referred to as a rear auxiliary wheel.

In more detail, the auxiliary wheel 715 may be provided on the side body 720. The auxiliary wheels 715 may be provided on the pair of side bodies 720, respectively. The auxiliary wheel 715 may protrude downward from a bottom surface of the side body 720. An auxiliary wheel through-hole through which the auxiliary wheel 715 passes may be defined in the bottom surface of the side body 720.

The auxiliary wheel 715 may include an omni wheel. Alternatively, the auxiliary wheel 715 may include a caster.

The foot supporter 700 may be provided with sensors 101 and 102 for detecting the surrounding environment of the robot 100.

The sensors 101 and 102 may include a front lidar 101 and an ultrasonic sensor 102.

The front lidar 101 may be provided on the front end of the foot supporter 700. In more detail, the front lidar 101 may be provided on a front end of the side body 720. The front lidar 101 may be disposed to protrude upward from the footrest 710.

The ultrasonic sensor 102 may be referred to as a front sensor. The ultrasonic sensor 102 may be provided on the front of the foot supporter 700. The ultrasonic sensor 102 may be provided in plurality, which are spaced apart from each other in the left-right direction.

The robot 100 may further include a lower plate 240 disposed below the foot supporter 700. The foot supporter 700 may move forward and backward with respect to the lower plate 240.

The lower plate 240 may be lengthily provided in the front-rear direction. The lower plate 240 may be disposed horizontally. The lower plate 240 may be disposed below the footrest 710. The lower plate 240 may pass through the opening 201 of the main body 200 like the foot supporter 700.

The robot 100 may further include a back cover 220 disposed behind the seating body 300.

The back cover 220 may be connected to the main body 200. The back cover 220 may be connected to an upper end of the rear surface 210c of the housing 210.

The back cover 200 may be disposed at a rear side of the backrest 500. The back cover 200 may cover at least a portion of the backrest 500 from the rear side.

The robot 100 may further include a user interface 640 that interacts with the user H.

The user interface 640 may be provided on at least one of the pair of arm supporters 600. The user interface 640 may be provided on the front end of the arm supporter 600. However, this embodiment is not limited thereto, and the user interface 640 may be connected to the main body 200 by a separate connection frame.

The user interface 640 may include an interface body 641 and a steering 642 provided on the interface body 641. The user interface 640 may further include a display 642.

The interface body 641 may be mounted to the arm supporter 600. The interface body 641 may include a substrate for operating the user interface 640.

The steering 642 may be an input interface through which the user H holds and manipulate the input interface to control the traveling direction or traveling speed of the robot 100.

The steering 642 may be provided to be elevated on the interface body 641. The steering 642 may be an adjusting device such as a jog & shuttle or a joystick.

The display 642 may be an output interface capable of displaying various information such as traveling information of the robot 100.

The display 642 may be connected to a front end of the interface body 641. The display 642 may be rotatably connected to the interface body 641.

When the user H rides on the robot 100, the display 642 may be disposed to be vertical or tilted. Here, the steering 642 may protrude upward from the interface body 641.

When the user H does not ride on the robot 100, the display H may rotate downward to cover a top surface of the interface body 641. In this case, the steering 642 may enter the inside of the interface body 641.

Figure 10A:
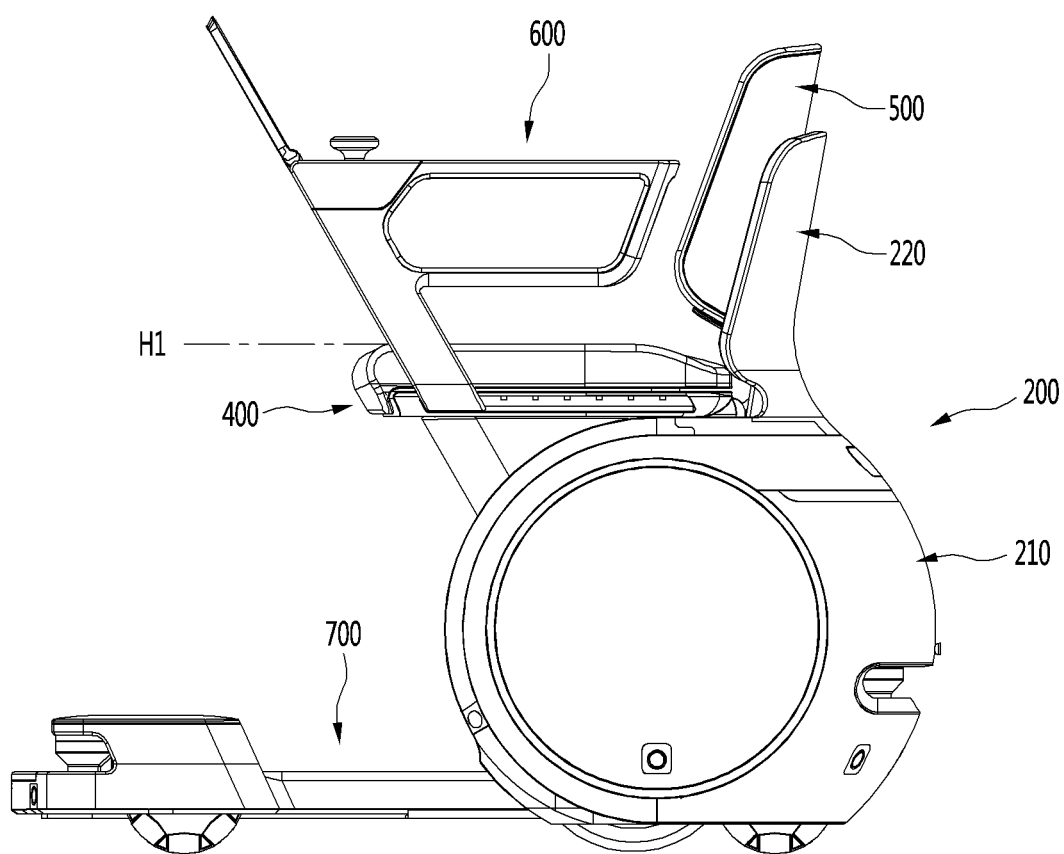
FIGS. 10A and 10B illustrate elevation of the seating body of the robot according to an embodiment.
Figure 10B:
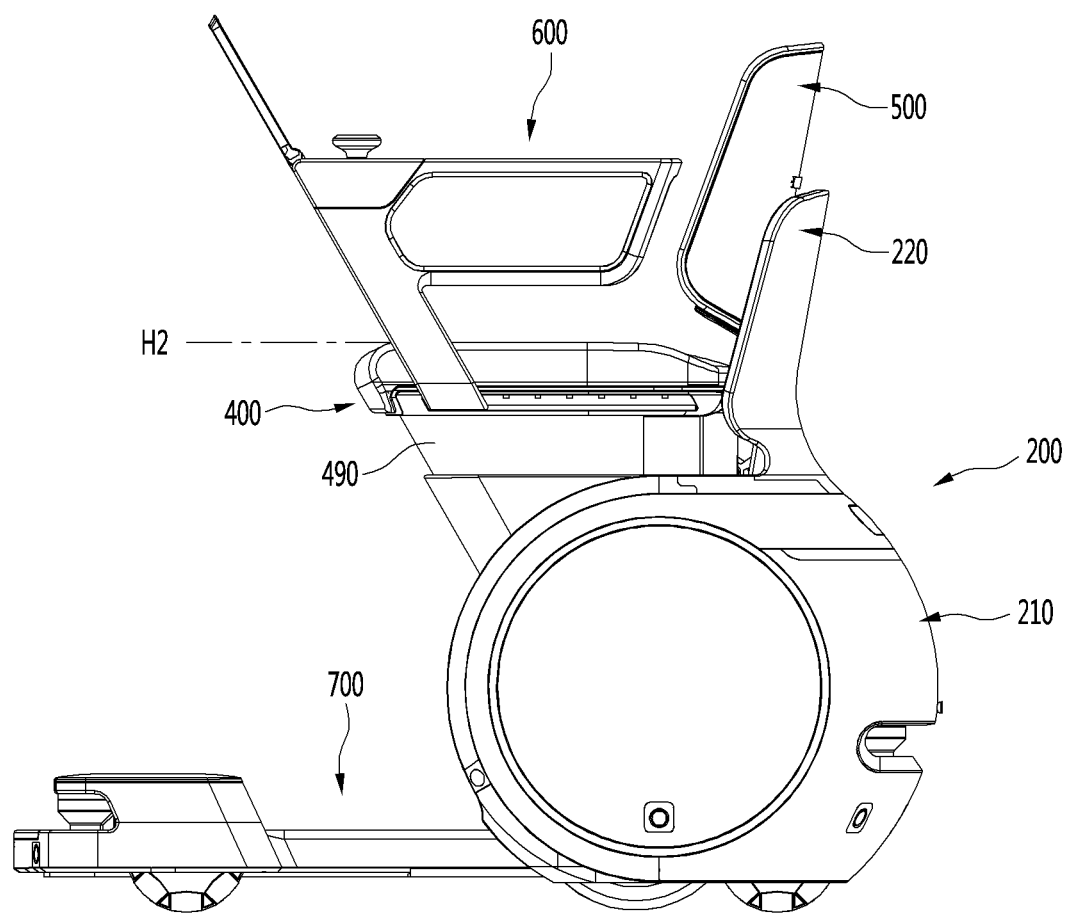

FIGS. 10A and 10B illustrate elevation of the seating body of the robot according to an embodiment.

An elevation mechanism 290 (see FIG. 18) for elevating the seating body 300 may be embedded in the main body 200. The seat 400 and the backrest 500 may be elevated together with respect to the main body 200 by the elevation mechanism 290. Also, the arm supporter 600 connected to the seat 400 may be elevated together with the seat 400.

The seating body 300 may be elevated between a first height H1, at which the seat 400 covers the top surface of the main body 200, and a second height H2 that is higher than the first height H1.

When the user H does not ride, the seating body 300 may descend to the first height H1. The robot 100 may be compact vertically.

When the user H rides, the user H may adjust a height of the seat 400 according to his/her body shape. The user H may adjust a height of the seat 400 in order to view business at the desk or table without standing up on the robot 100.

The robot 100 may further include a gap cover 490 that covers a gap defined between the seat 400 and the main body 200 when the seating body 300 ascends. The gap cover 490 may be elevated together with the seating body 300.

When the seating body 300 is disposed at the first height H1, the gap cover 490 may be hidden inside the main body 200. When the seating body 300 is disposed at the second height H2, the gap cover 490 may protrude upward from the main body 200.

The outer appearance of the robot 100 may be improved in design by the gap cover 490. Also, when the seating body 300 ascends, foreign substances and the like may be minimally introduced between the main body 200 and the seat 400.

Figure 11A:
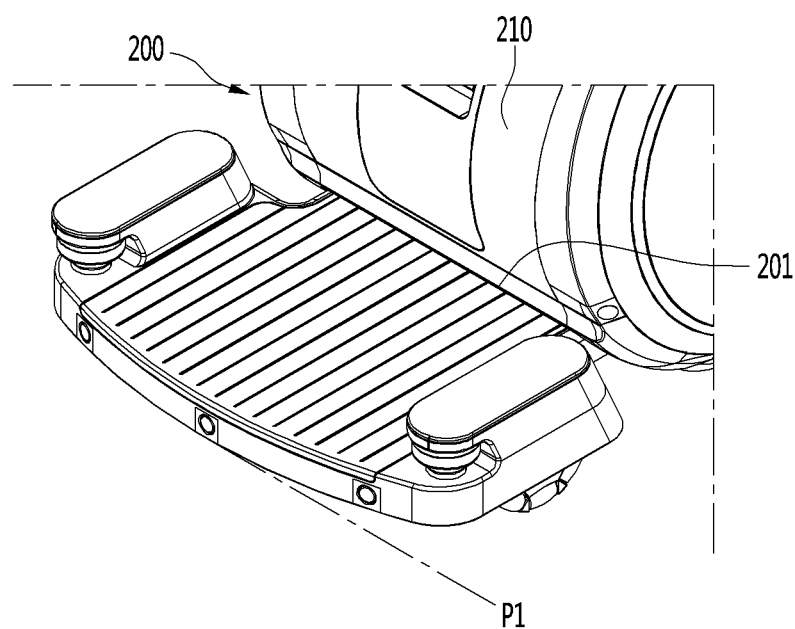
FIGS. 11A and 11B illustrate forward and backward movement of the foot supporter of the robot according to an embodiment.
Figure 11B:
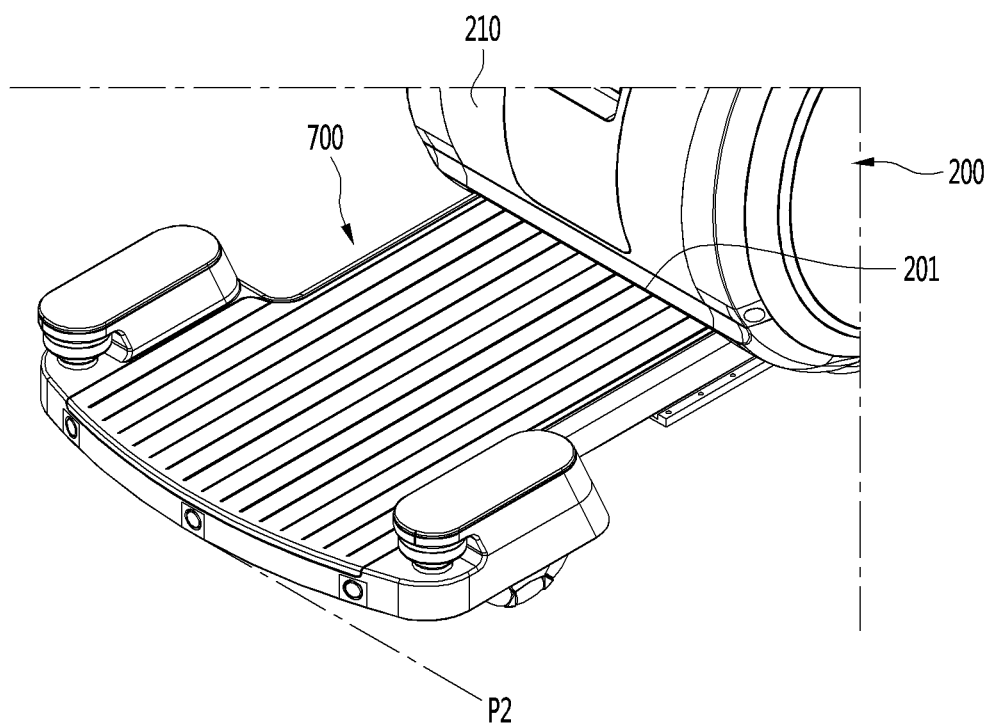

FIGS. 11A and 11B illustrate forward and backward movement of the foot supporter of the robot according to an embodiment.

The foot supporter 700 may move in the front-rear direction with respect to the main body 200. Thus, the foot supporter 700 protruding forward from the main body 200 through the opening 201 may vary in length.

A foot supporter moving mechanism 280 (see FIG. 21) may be provided between the lower plate 240 (see FIG. 8) and the foot supporter 700 described above to allow the foot supporter 700 to move forward and backward. The foot supporter may move forward and backward with respect to the main body 200 and the lower plate 240 by the foot supporter moving mechanism 280.

The foot supporter 700 may move forward and backward between a first position P1 and a second position P2 disposed in front of the first position P1.

When the user H does not ride, the foot supporter 700 may move to the first position P1. As a result, the robot 100 may be compact in the front-rear direction.

When the user H rides, the user H may adjust a degree of protrusion of the foot supporter 700 with respect to the main body 200 according to a length of his leg.

Figure 12A:
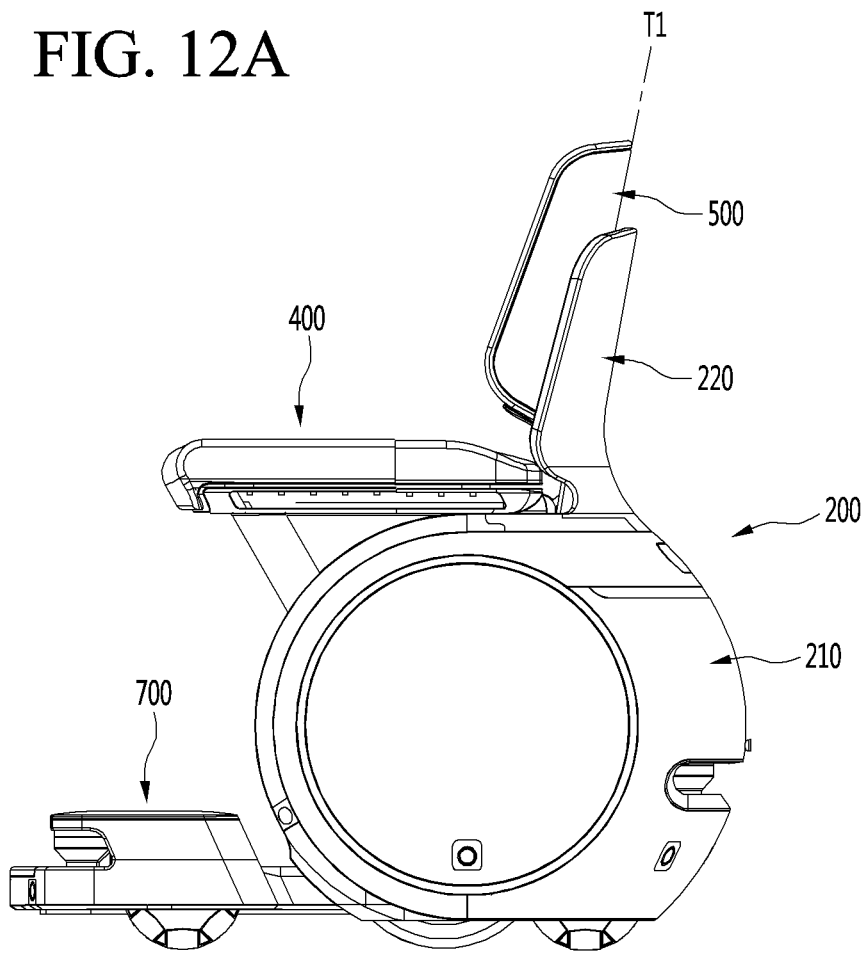
FIGS. 12A and 12B illustrate tilting of the backrest of the robot according to an embodiment.
Figure 12B:
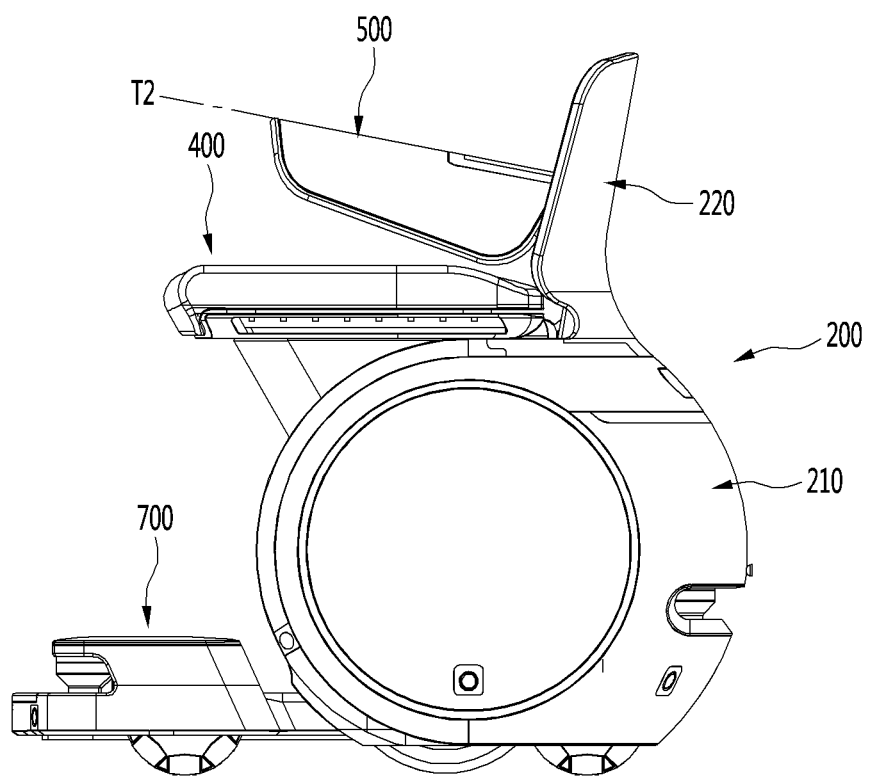

FIGS. 12A and 12B illustrate tilting of the backrest of the robot according to an embodiment.

The backrest 500 may be tilted with respect to the seat 400. Tilting mechanisms 560 and 570 (see FIG. 21) for tilting the backrest 500 may be provided on at least one of the seat 400 or the backrest 500.

The backrest 500 is tilted between a first inclination T1, at which a rear surface of the backrest 500 is covered by the back cover 220, and a second inclination T2 that is further tilted forward than the first inclination T1.

When the user H does not ride, the backrest 500 may be tilted at the second tilt T2. As a result, the robot 100 may be compact vertically, and an unauthorized user may be prevented from riding on the robot 100.

When the user H rides, the user H may adjust the inclination of the backrest 500 so as to be comfortable seated.

Figure 13A:
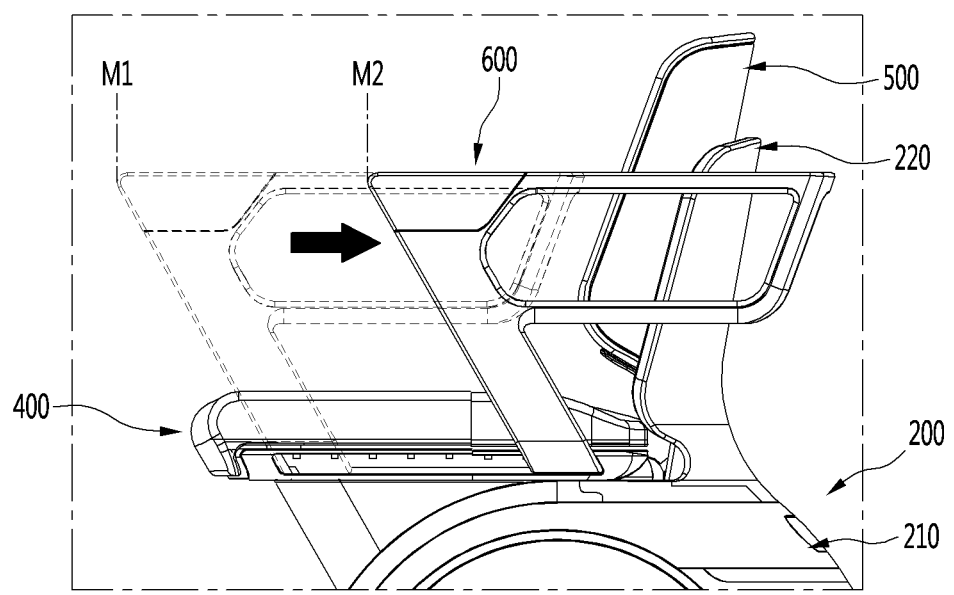
FIGS. 13A to 13C illustrate forward and backward movement of the arm supporter according to an embodiment.
Figure 13B:
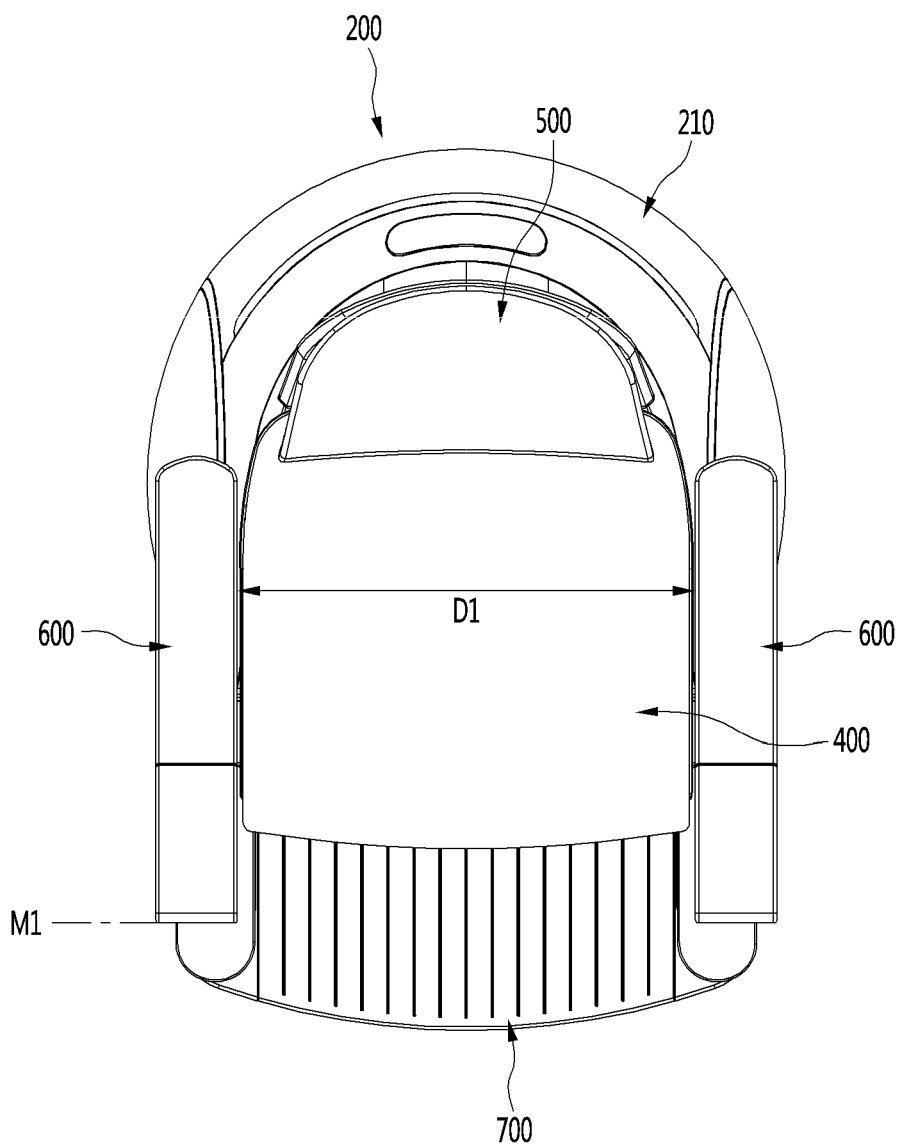
Figure 13C:
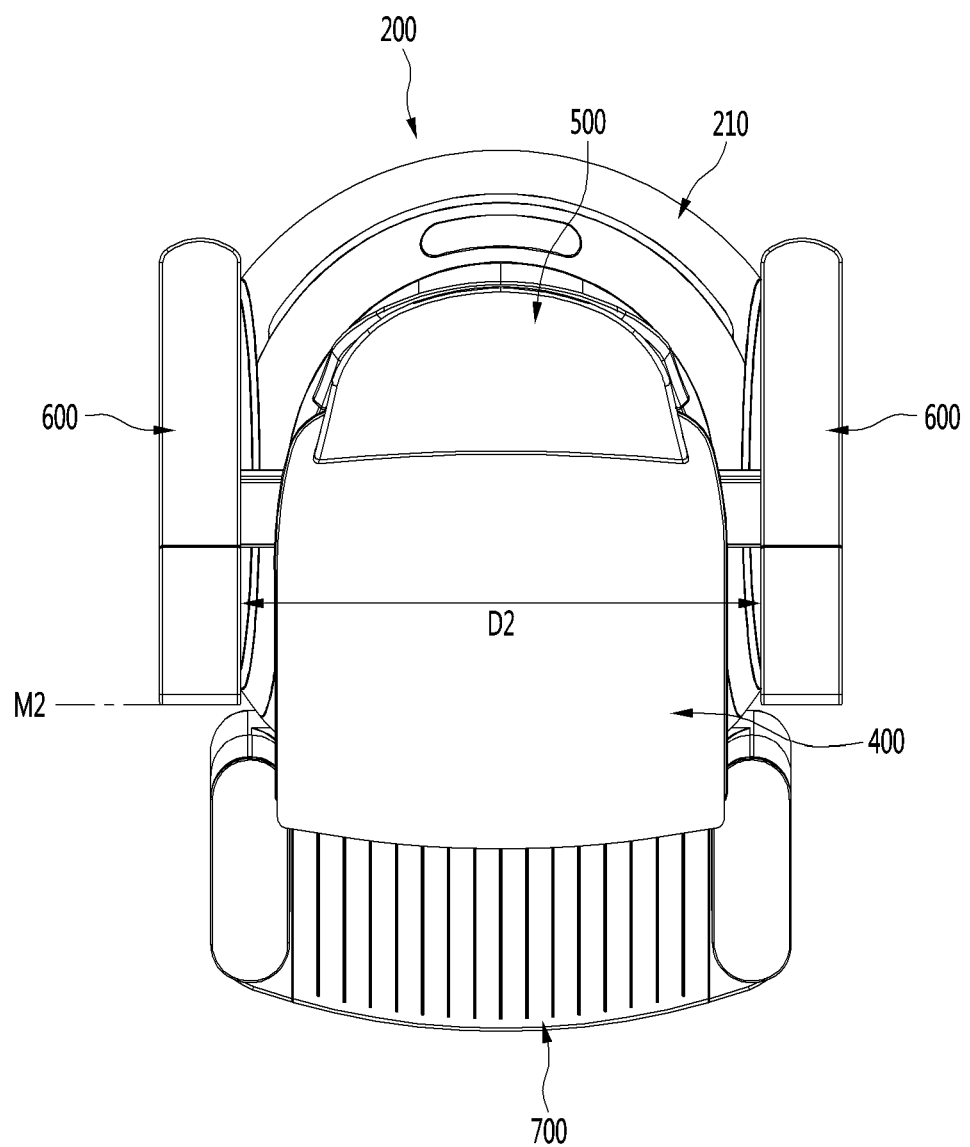

FIGS. 13A to 13C illustrate forward and backward movement of the arm supporter according to an embodiment.

The arm supporter 600 may move in the front-rear direction with respect to the seat 400. The arm supporter 600 may be slid in the front-rear direction with respect to the seat 400.

An arm supporter moving mechanism 480 (see FIG. 18) for allowing the arm supporter 600 to move in the front-rear direction may be provided within the seat 400.

The arm supporter 600 may move between a first position M1 and a second position M2 disposed behind the first position M1.

The pair of arm supporters 600 may be away from each other as the arm supporters 600 move backward. In more detail, a distance D2 between the pair of arm supporters when the pair of arm supporters 600 are disposed at the second position M2 is greater than a distance D2 between the pair of arm supporters when the pair of arm supporters 600 are disposed at the first position M1.

Just before the user H rides, the pair of arm supporters 600 may move to the second position M2, and the distance between the pair of arm supporters 600 may be farther away. As a result, the user H may be easily seated on the seat 400 without being disturbed by the arm supporter 600.

After the user H rides, the user H may allow the arm supporter 600 to move to a position at which the user is comfortably seated.

Figure 14A:
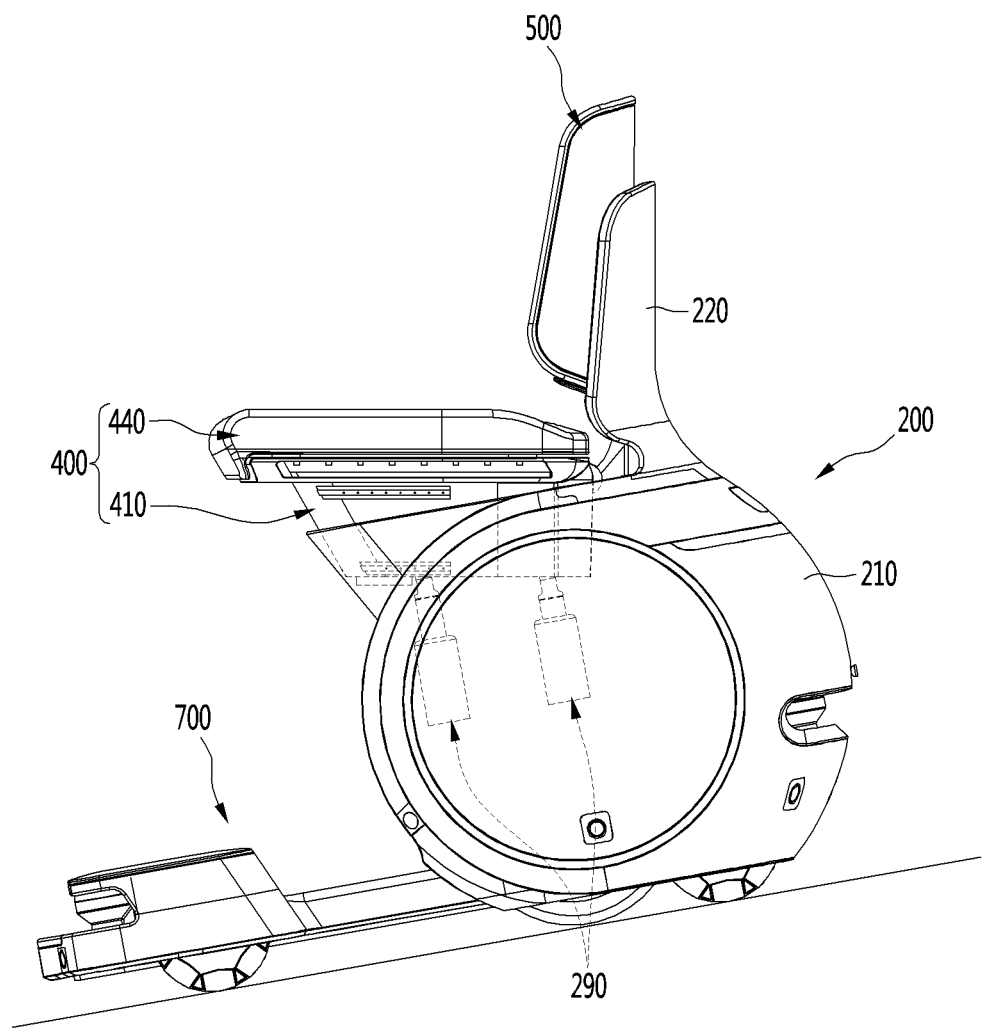
FIGS. 14A and 14B illustrate horizontal maintenance of the seat according to an embodiment.
Figure 14B:
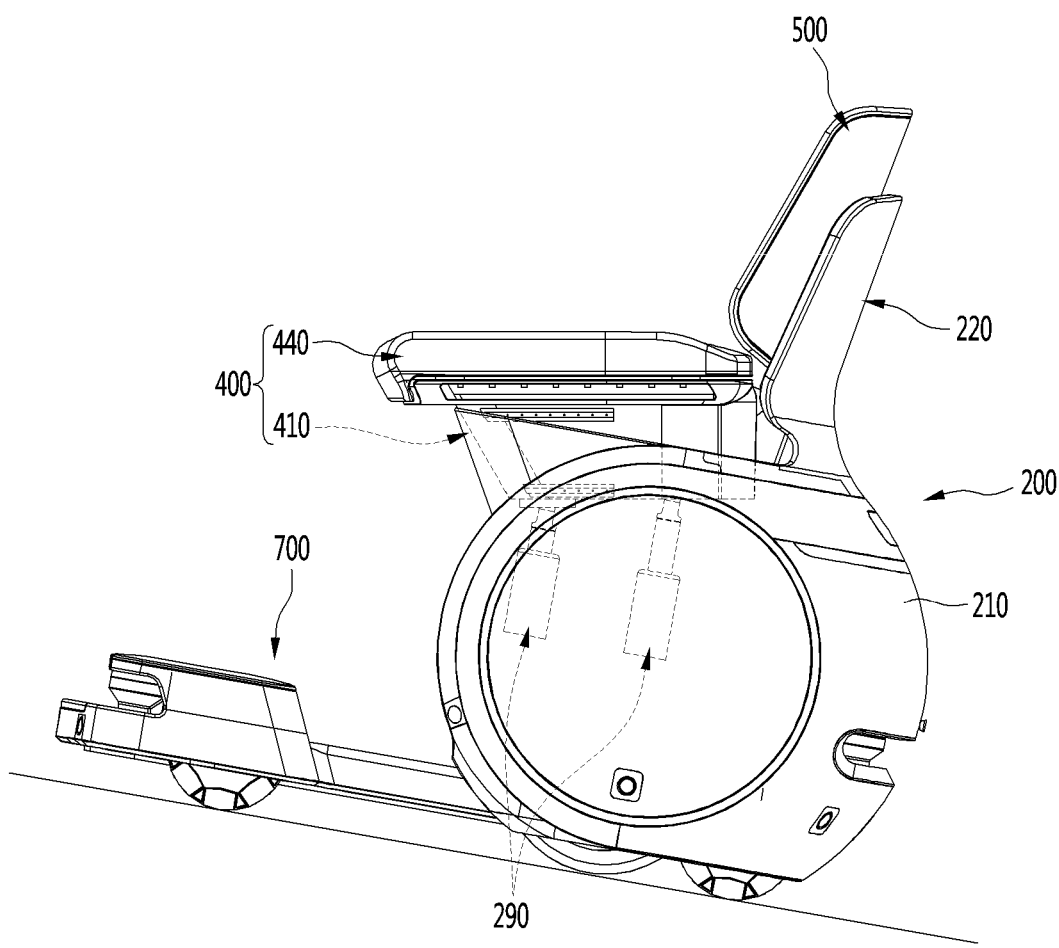

FIGS. 14A and 14B illustrate horizontal maintenance of the seat according to an embodiment.

The elevation mechanism 290 for elevating the seating body 300 may act as a leveling mechanism for maintaining the seat 400 horizontally.

The elevation mechanism 290 may include a plurality of actuators that are spaced apart from each other in the front-rear direction. The plurality of actuators may be driven independently with respect to each other to maintain the seat 400 horizontally.

In more detail, when the plurality of actuators are elevated at the same height, the seat 400 may be elevated. When the plurality of actuators are elevated at different heights, the seat 400 may be horizontally maintained.

As illustrated in FIG. 14A, when the robot 100 travels downhill, the front actuator may be adjusted to a relatively high height, and the rear actuator may be adjusted to a relatively low height. On the other hand, as illustrated in FIG. 14b, when the robot 100 travels uphill, the front actuator may be adjusted to a relatively low height, and the rear actuator may be adjusted to a relatively high height. The front actuator may mean an actuator disposed relatively forward among the plurality of actuators 291 provided in the elevation mechanism 290, and the rear actuator may mean an actuator disposed relatively backward among the plurality of actuators 291 provided in the elevation mechanism 290.

As a result, the user H that rides on the robot 100 may feel comfortable ride regardless of the inclination of the floor surface.

Figure 15:
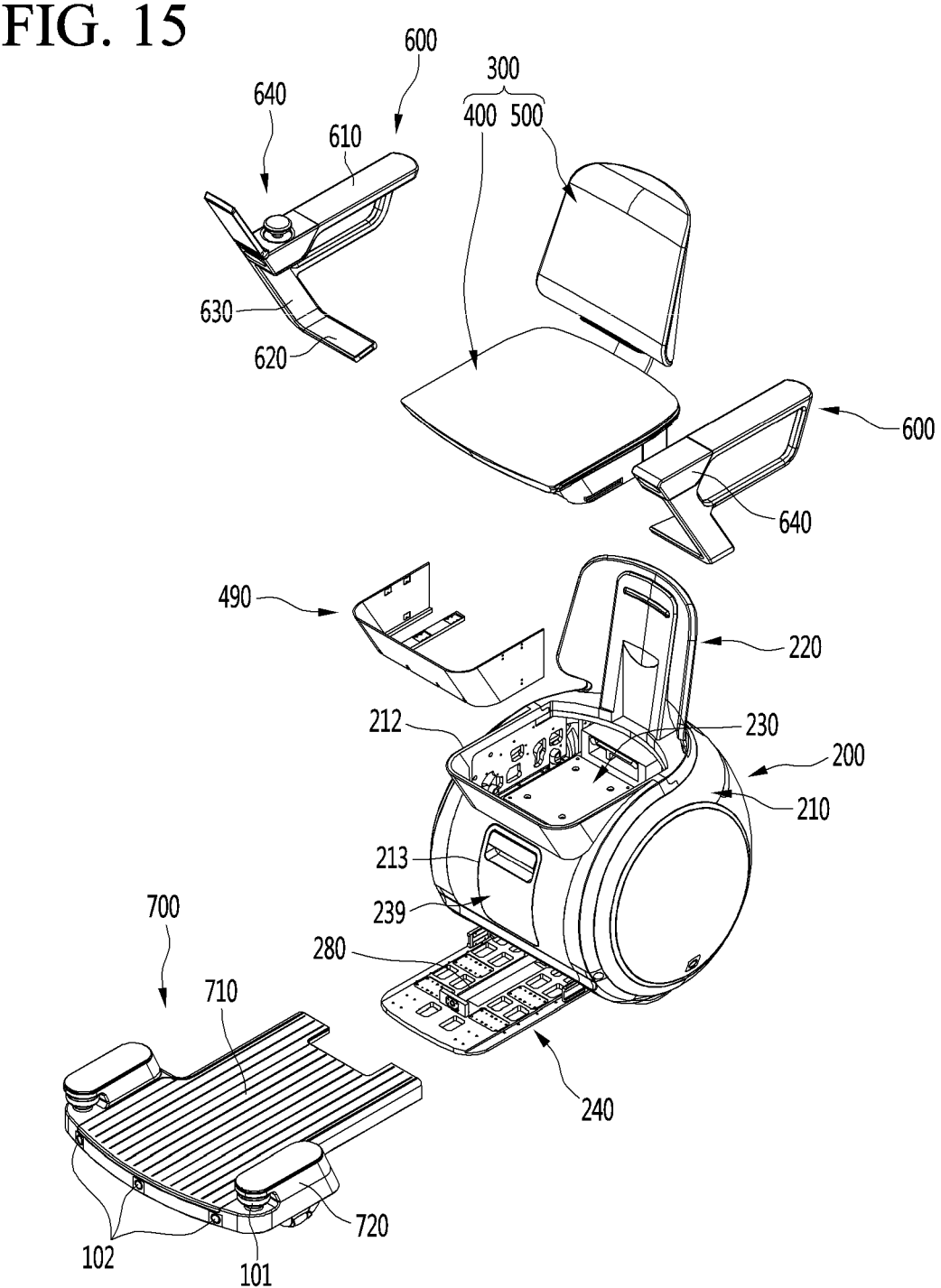
FIG. 15 illustrates an exploded perspective view of the robot according to an embodiment.
Figure 16:
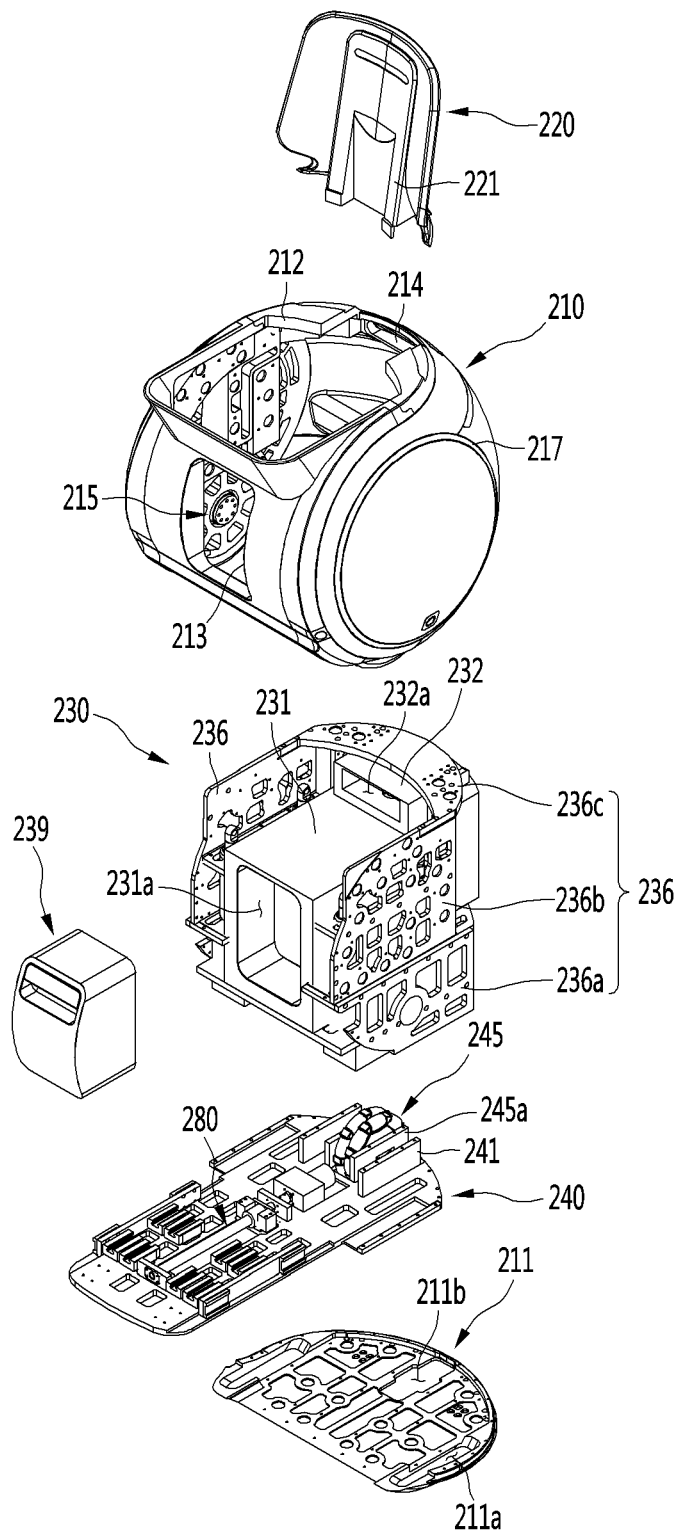
FIG. 16 illustrates an exploded perspective view of a main body and peripheral components of FIG. 15.
Figure 17:
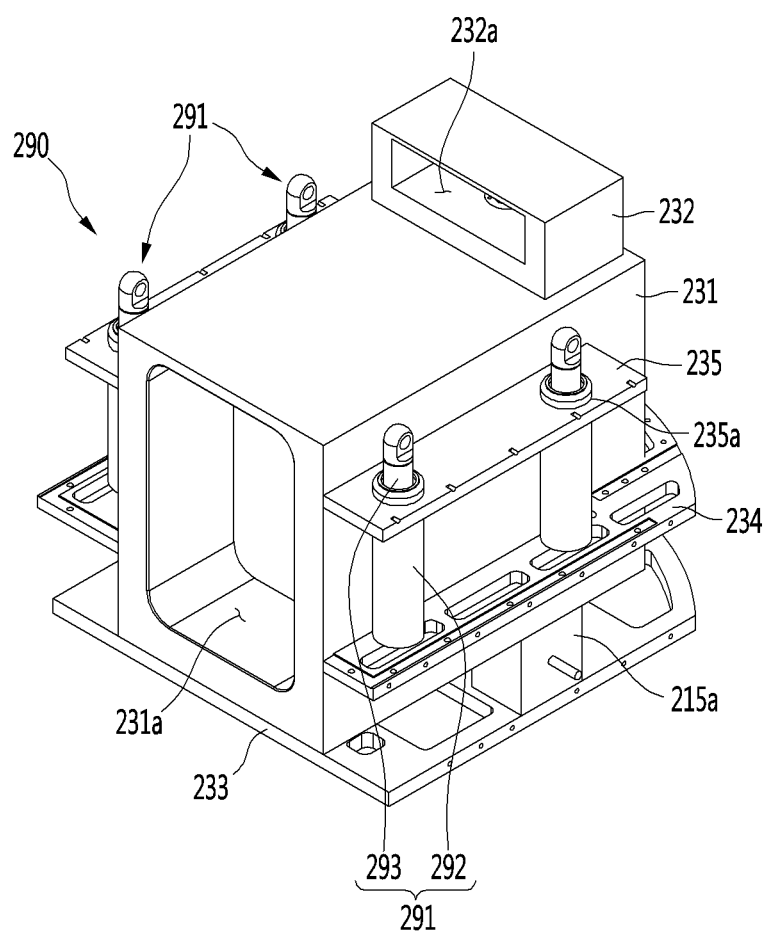
FIG. 17 illustrates a state in which an inner cover is removed from an inner body of FIG. 16.
Figure 18:
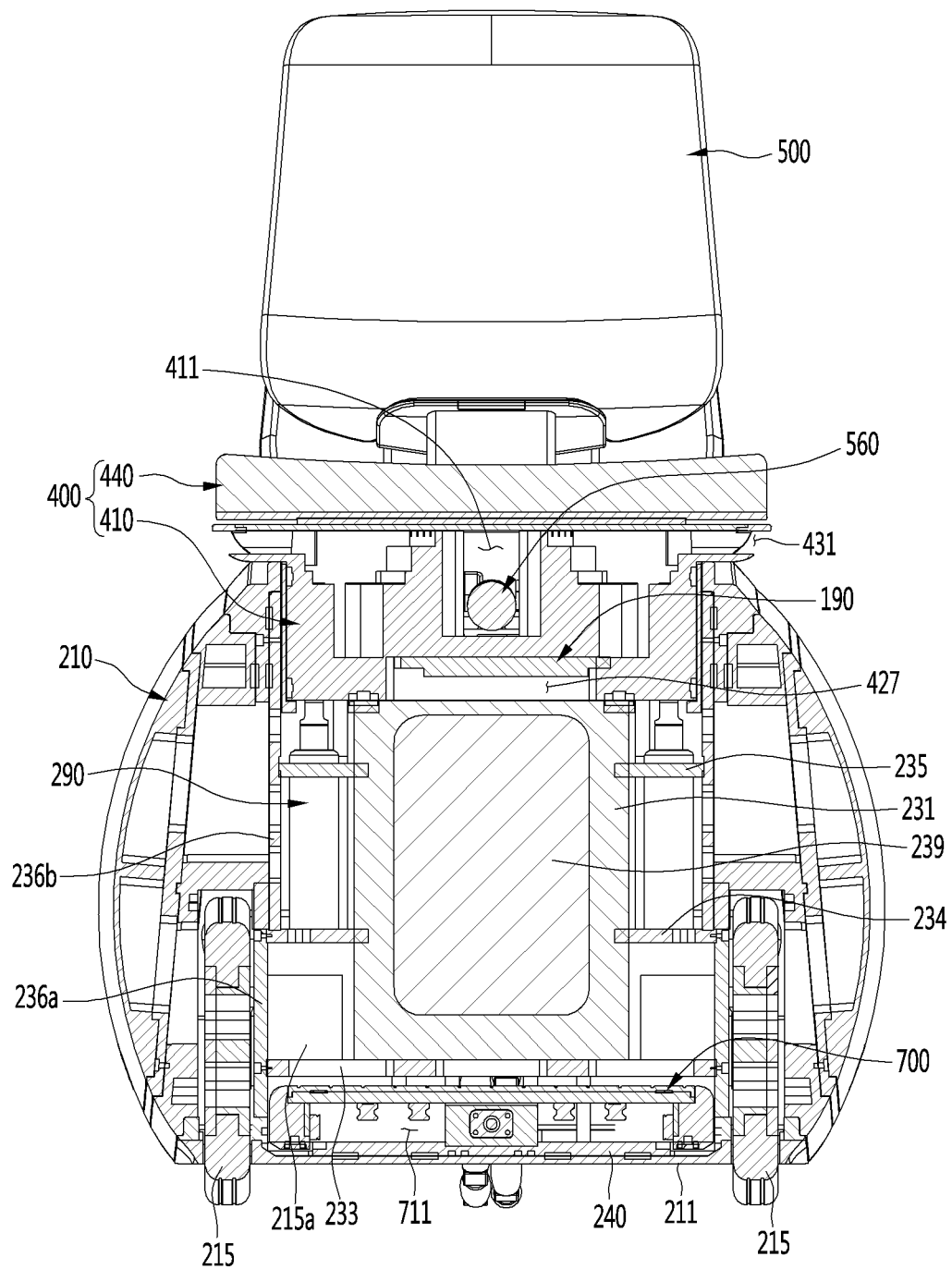
FIG. 18 illustrates a cross-sectional view of the robot, taken along a left-right cutoff line according to an embodiment.

FIG. 15 illustrates an exploded perspective view of the robot according to an embodiment, FIG. 16 illustrates an exploded perspective view of the main body and peripheral components of FIG. 15, FIG. 17 illustrates a state in which an inner cover is removed from an inner body of FIG. 16, and FIG. 18 illustrates a cross-sectional view of the robot, taken along a left-right cutoff line according to an embodiment.

The arm supporter 600 may include an armrest 610, an insertion portion 620, and a connection portion 630.

The armrest 610 may be lengthily disposed in the approximately front-rear direction. The armrest 610 may be disposed horizontally. The user H may place the arm on the armrest 610.

The insertion portion 620 may be inserted into the seat 400. The insertion portion 620 may be lengthily disposed in the left-right direction and be disposed horizontally. The insertion portion 620 may be lengthily disposed from a side of the seat 400 toward the seat 400 and be inserted into the seat 400.

The arm supporter 600 may move forward and backward in the state in which the insertion portion 620 is inserted into the seat 400.

The connection portion 630 may connect the armrest 610 to the insertion portion 620. The connection portion 630 may be elongated in a vertical or tilted direction. The connector 630 may be connected to a lower side of the armrest 610. The connection portion 630 may be connected to an outer end of the insertion portion 620. The connector 630 may be disposed below a user interface 640.

On the other hand, an opening portion 212 may be defined in the top surface of the main body 200. The opening portion 212 may be defined by opening the top surface of the housing 210.

The seat 400 may cover the opening portion 212 from an upper side. The gap cover 490 may be elevated together with the seat 400 through the opening portion 212.

The back cover 220 may be connected to the housing 210. The back cover 220 may be connected to a rear edge of the opening portion 212.

An avoidance groove 221 that avoids an interference with a link (see FIG. 19) that will be described below may be defined in the back cover 220. The avoidance groove 221 may be recessed to be stepped backward from the front surface of the back cover 220.

The main body 200 may further include an inner body 230 disposed in the housing 210. The inner body 230 may be disposed above the lower plate 240 and the lower cover 211.

The inner body 230 may include a battery mounting body 231 on which the battery 239 is mounted. In more detail, a battery accommodation space 231a in which the battery 239 is accommodated may be defined in the battery mounting body 231. The battery accommodation space 231a may be disposed behind the battery insertion hole 213 defined in the housing 210 and may communicate with the battery insertion hole 213.

Thus, the battery 237 may be mounted in the battery mounting body 231 by being accommodated in the battery accommodation space 231a through the battery insertion hole 213.

The battery mounting body 231 may be disposed below the seat 400.

The inner body 230 may further include an accessory insertion body 232 into which a portion of the accessory 120 (see FIG. 9) is inserted.

The accessory insertion body 232 may be disposed above the battery mounting body 231. The accessory insertion body 232 may be disposed at a rear end of a top surface of the battery mounting body 231.

The accessory insertion body 232 may have an accessory insertion space 232a that communicates with the accessory insertion hole 214. The accessory insertion space 232a may be disposed in front of the accessory insertion hole 214 defined in the housing 210.

Thus, a portion of the accessory 120 may be inserted into the accessory insertion space 232a through the accessory insertion hole 214. The accessory 120 may be mounted on the main body 200.

Figure 21:
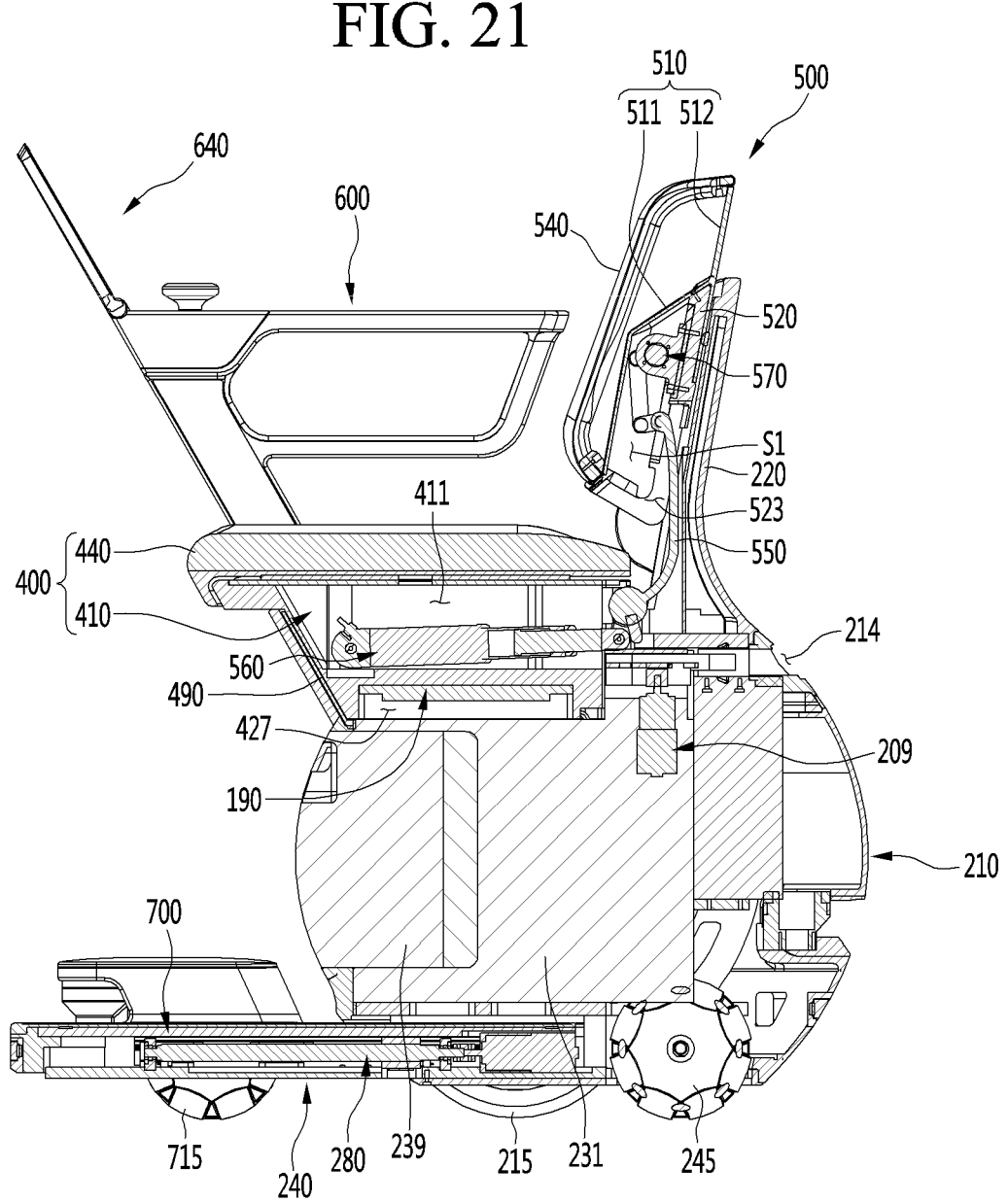
FIG. 21 illustrates a cross-sectional view of the robot, taken along a front-rear cutoff line according to an embodiment.

The accessory 120 mounted on the main body 200 may be locked by a locking mechanism 209 (see FIG. 21). When the accessory 120 is locked, the accessory 120 may not be separated from the accessory insertion space 232a and the accessory insertion hole 214 even if external force is applied to the accessory 120 backward.

The locking mechanism 209 may be embedded in the main body 200. The locking mechanism 209 may be provided on the inner body 230.

For example, a locking hole that is penetrated vertically may be defined in the accessory 120. When the accessory 120 is mounted on the main body 200, the locking hole may be disposed in the accessory insertion space 232a. The locking mechanism 209 may include a mover that moves vertically.

The mover may ascend to be locked with the locking hole in the state in which the locking hole is disposed in the accessory insertion space 232a. This allows the accessory 120 to be locked. On the contrary, when the mover descends, the accessory 120 may be unlocked.

On the other hand, the elevation mechanism 290 for elevating the seat 400 may be embedded in the main body 200. In more detail, the elevation mechanism 290 may be provided on the inner body 230.

The elevation mechanism 290 may be disposed below the seat 400. The elevation mechanism 290 may elevate the seat 400 through the opening portion 212 of the main body 200.

The elevation mechanism 290 may include a plurality of actuators 291 that move vertically. The plurality of actuators 291 may be spaced apart from each other. The plurality of actuators 291 may be driven independently with respect to each other.

For example, the actuator 291 may be an electric hydraulic cylinder that is disposed vertically. The actuator 291 may include a cylinder 292 fixed to the inner body 230 and a piston 293 moving vertically with respect to the cylinder 292. An upper end of the piston 293 may push the bottom surface of the seat 400 upward or pull the bottom surface of the seat 400 downwards. The upper end of the piston 293 may be connected to the bottom surface of the seat 400.

The actuator 291 may not only elevate the seat 400, but also reduce an impact transmitted to the user H according to an unevenness of the bottom surface when the robot 100 travels. That is, the actuator 291 may act as a shock absorber.

The plurality of actuators 291 may be disposed around the battery mounting body 231.

In more detail, a portion of the plurality of actuators 291 may be disposed at one side of the battery mounting body 231, and the other portion may be disposed at the other side of the battery mounting body 231. For example, two actuators 291 may be disposed on both sides of the battery mounting body 231, respectively. Accordingly, the plurality of actuators 291 may be efficiently disposed in the limited space in the housing 210.

Each of the actuators 291 may be connected to an edge portion of the seat 400 rather than a central portion thereof. Thus, even when the robot 100 travels along the tilted surface, and the main body 200 is tilted, the plurality of actuators 291 may be driven independently to maintain the seat 400 horizontally.

The inner body 230 may further include a support plate 234 for supporting the actuator 291 and a fixing plate 235 for fixing the actuator 291.

The support plate 234 and the fixed plate 235 may be disposed horizontally on a circumferential surface of the battery mounting body 231. In more detail, the support plate 234 and the fixing plate 235 may be horizontally disposed on both side surfaces of the battery mounting body 231.

The fixing plate 235 may be disposed above the support plate 234. The support plate 234 and the fixing plate 235 may be spaced apart from each other in the vertical direction.

The support plate 234 may support the actuator 219, in particular, the cylinder 292 from a lower side.

The fixing plate 235 may fix the actuator 291, in particular, the cylinder 292. The fixing plate 235 may have a through-hole 235a through which the cylinder 292 passes. An inner circumference of the through-hole 235a may contact an outer circumference of the cylinder 292. Thus, the cylinder 292 may be fixed so as not to be shaken in a horizontal direction.

The inner body 230 may further include a base plate 233 that supports the battery mounting body 231 from the lower side. The base plate 233 may be disposed horizontally. The base plate 233 may define a bottom surface of the inner body 230.

A horizontal width of the base plate 233 may be greater than that of the battery mounting body 231. A portion of both sides of the base plate 233 may be spaced apart from a lower side of the support plate 234.

A traveling motor 215a for allowing the traveling wheel 215 to rotate may be disposed between the base plate 233 and the support plate 234. If the travel motor 215a is not directly connected to the travel wheel 215, and rotational force of the travel motor 215a is transmitted to the travel wheel 215 by a power transmission member (not shown), the power transmission member may also be disposed between the base plate 233 and the support plate 234.

The inner body 230 may further include an inner cover 236.

The inner cover 236 may include a pair of side covers 236a and 236b and an upper cover 236c connecting the pair of side covers 236a and 236b to each other.

The pair of side covers 236a and 236b may be disposed at both sides of the battery mounting body 231, respectively. The side covers 236a and 236b may cover edges of the support plate 234 and the fixing plate 235. The side covers 236a and 236b may be disposed vertically.

In more detail, the side covers 236a and 236b may include a first side cover 236a and a second side cover 236b.

The first side cover 236a may cover a space between the base plate 233 and the support plate 234. As a result, the travel motor 215a disposed between the base plate 233 and the support plate 234 may be protected by the first side cover 236a.

The second side cover 236b may be disposed above the first side cover 236a. The second side cover 236b may cover a space between the support plate 234 and the fixing plate 235. Also, the second side cover 236b may cover an upper space of the fixing plate 235.

That is, the second side cover 236b may cover the elevation mechanism 290 from the outside. As described above, the elevation mechanism 290 may be protected by the second side cover 236b.

The traveling wheel 215 may be disposed outside the first side cover 236a. The travel motor 215 may be connected to the travel wheel 215 through a through-hole defined in the first side cover 236a.

The upper cover 236c may be disposed above the accessory insertion body 232. The upper cover 236c may connect the upper ends of the pair of second side covers 236b to each other.

On the other hand, the lower plate 240 may be disposed below the inner body 230. In more detail, a portion of a rear side of the lower plate 240 may be disposed below the inner body 230. The lower cover 211 may cover the portion of the rear portion of the lower plate 240 from the lower side.

The lower plate 240 may pass between the pair of traveling wheels 215. The lower plate 240 may have a left-right width less than a left-right direction between the pair of traveling wheels 215. Thus, the traveling wheel 215 may pass through the traveling wheel through-hole 211a of the lower cover 211 without interfering with the lower plate 240.

The auxiliary wheel 245 may be connected to the lower plate 240. In more detail, a pair of wheel connection portions 245a to which the auxiliary wheels 245 are rotatably connected may be disposed on the lower plate 240. The auxiliary wheels 245 connected between the pair of wheel connection portions 245*a* may pass through the auxiliary wheel through-holes 211*b* of the lower cover 211.

A foot supporter moving mechanism 280 for allowing the foot supporter 700 to move forward and backward may be disposed between the foot supporter 700 and the lower plate 240.

That is, an inner space 711 in which the foot supporter moving mechanism 280 is disposed may be defined between the foot supporter 700 and the lower plate 240.

For example, the foot supporter moving mechanism 280 may include a motor installed on the lower plate 280, a lead screw connected to the motor and lengthily disposed in the front-rear direction, and a moving body moving forward and backward along the lead screw and coupled to the foot supporter 700. Thus, the foot supporter 700 may move forward and backward together with the moving body.

A protrusion 241 that allows the lower plate 240 to be spaced apart from the inner body 230 may be disposed on the lower plate 240. The protrusion 241 may protrude upward from a top surface of the lower plate.

The protrusion 241 may support the inner body 230 from the lower side. In more detail, the protrusion 241 may support the base plate 233 of the inner body 230 from the lower side.

The protrusion 241 may be provided in a pair, which are respectively disposed on sides of the pair of wheel connection portion 245*a*. The pair of wheel connection portions 245*a* may space the lower plate 240 from the inner body 230 together with the protrusion 241.

A space may be defined between the lower plate 240 and the inner body 230 by the protrusion 241. In more detail, the spaced space may be defined between the top surface of the lower plate 240 and the bottom surface of the base plate 233. A portion of the rear side of the foot supporter 700 may enter the spaced space.

The footrest 710 of the foot supporter 700 may be disposed above the lower plate 240. A portion of the rear side of the footrest 710 may be inserted between the lower plate 240 and the inner body 230. The foot supporter moving mechanism 280 may be provided between the footrest 710 and the lower plate 240.

Figure 19:
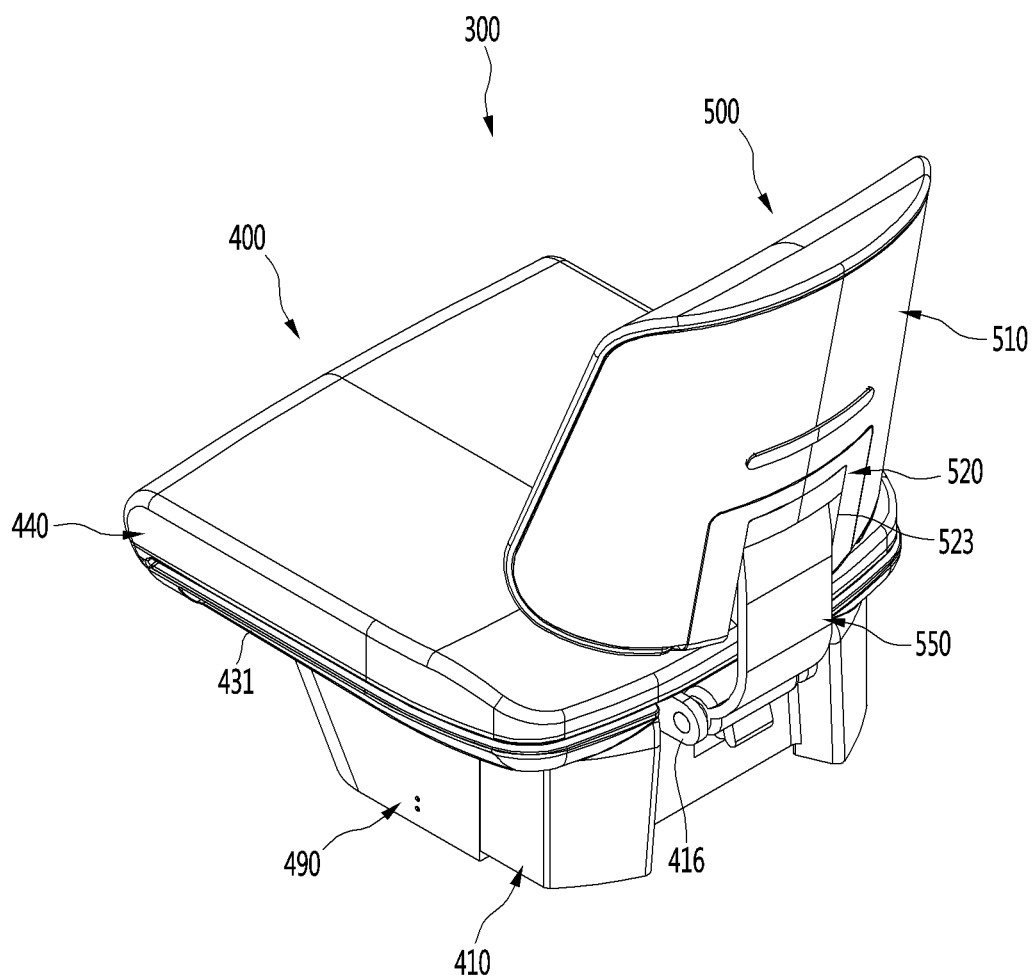
FIG. 19 illustrates a perspective view of a seating body when viewed from a rear side according to an embodiment.
Figure 20:
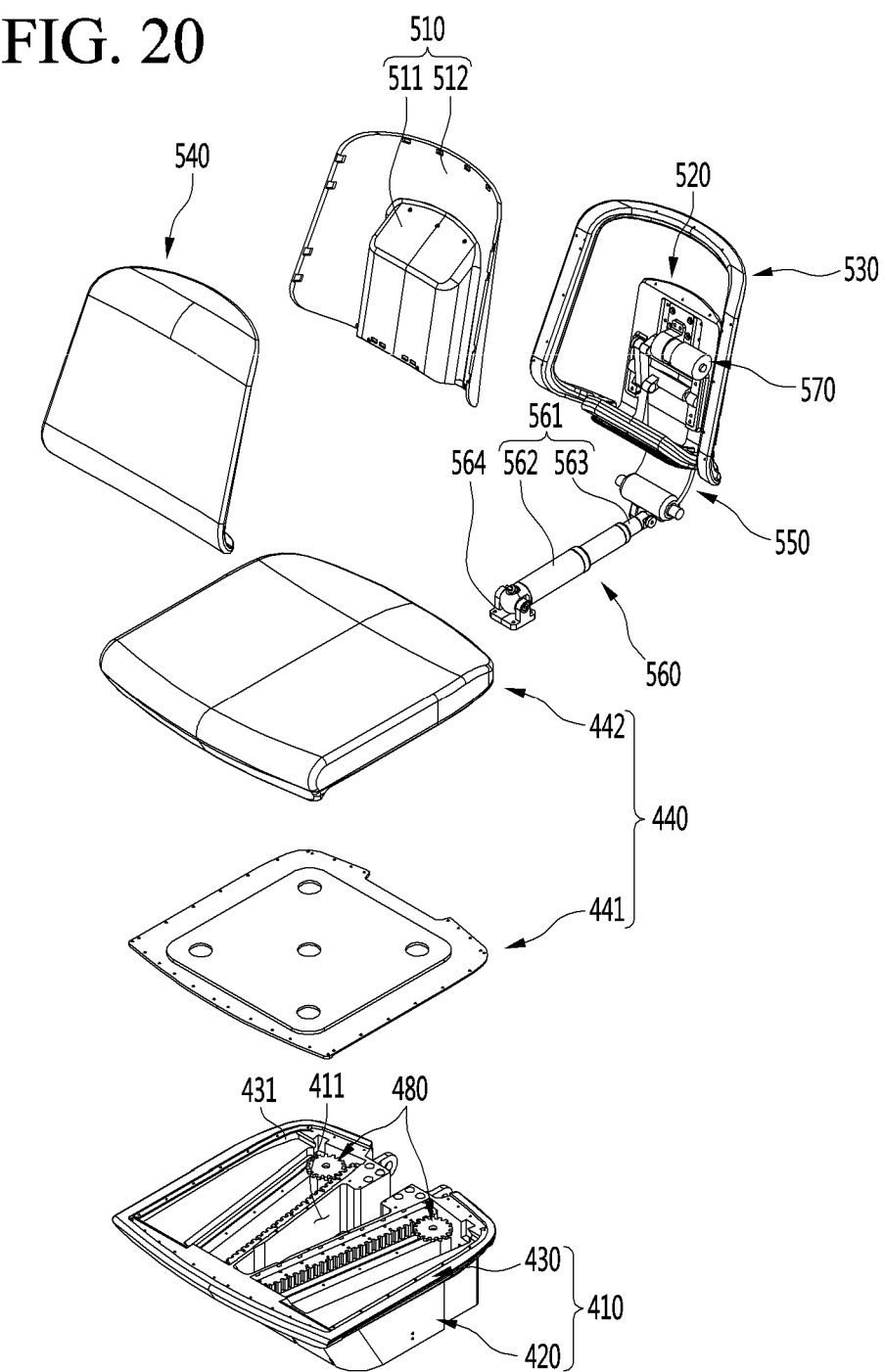
FIG. 20 illustrates an exploded perspective view of the seating body according to an embodiment.

FIG. 19 illustrates a perspective view of a seating body when viewed from the rear side according to an embodiment, FIG. 20 illustrates an exploded perspective view of the seating body according to an embodiment, and FIG. 21 illustrates a cross-sectional view of the robot, taken along a front-rear cutoff line according to an embodiment.

As described above, the seating body 300 may include the seat 400 and the backrest 500.

The seat 400 may include a seat base 410 and a seat pad 440 covering the seat base 410 from an upper side.

A portion of a lower side of the seat base 410 may be inserted into the main body 200 through the opening portion 212 (see FIG. 15).

In more detail, the seat base 410 includes a lower base 420 inserted into the main body 200 through the opening portion 212 and an upper base 430 covering the opening portion 212.

The lower base 420 may be disposed between the pair of side covers 236*a* (see FIG. 16). The lower base 420 may be disposed above the battery mounting body 231.

The gap cover 490 may be connected to the lower base 420. The gap cover 490 is normally hidden inside the main body 200, and when the seat 400 ascends, the gap cover 490 may ascend together with the seat 400 to cover a gap between the main body 200 and the seat 400.

The upper base 430 may be connected to an upper end of the lower base 420. The upper base 430 may have a size greater than that of the lower base 420 in the horizontal direction. Thus, the upper base 430 may be hooked around the upper end of the opening portion 212 without being inserted into the opening portion 212 of the main body 200. As a result, the upper base 430 may cover the opening portion 212.

A substrate accommodation space 427 in which the substrate 190 is disposed may be defined in the seat base 410. The substrate accommodation space 427 may be defined by being recessed upward from the bottom surface of the seat base 410. In more detail, the substrate accommodation space 427 may be defined by being recessed upward from the bottom surface of the lower base 420. The battery mounting body 231 may cover the substrate accommodation space 427 from a lower side.

The substrate 190 may be coupled to an inner top surface of the substrate accommodation space 427. As a result, the substrate 190 may be elevated together with the seat 400. A controller for controlling an overall operation of the robot 100 may include a processor provided on the substrate 190.

A long hole 431 to which the arm supporter 600 is connected may be defined in the seat base 410. An insertion portion 620 (see FIG. 15) of the arm supporter 600 may be inserted into the long hole 431.

In more detail, the long hole 431 may be defined in the upper base 430. The long hole 431 may be lengthily defined in the front-rear direction. The long hole 431 may be provided with a pair, which are defined in both sides of the upper base 430.

The top surface of the seat base 410 may be opened. The seat pad 440 may cover the opened top surface of the seat base 410 from the upper side.

In more detail, the seat pad 440 may include a base cover 441 covering the opened top surface of the seat base 410 and a seat cushion 442 covering the top surface of the base cover 441.

The base cover 441 may be made of a hard material, and the seat cushion 442 may be made of a flexible material. As a result, the seat cushion 442 may provide comfortable sitting feeling to the user H. Also, the impact transmitted from the floor surface on which the robot 100 travels may be absorbed by the seat cushion 442 and thus may not be transmitted to the user H.

The arm supporter moving mechanism 480 that allows the arm supporter 600 to move forward and backward may be embedded in the seat 400. In more detail, the arm supporter moving mechanism 480 may be disposed between seat base 410 and seat pad 440.

The arm supporter moving mechanism 480 may be installed on the seat base 410, and the base cover 441 may cover the arm supporter moving mechanism 480 from the upper side.

The arm supporter moving mechanism 480 may be coupled to the insertion portion 620 of the arm supporter 600 inserted into the long hole 431. Thus, the arm supporter 600 may move along the long hole 431 by the arm supporter moving mechanism 480.

The arm supporter moving mechanism 480 may be provided in a pair, which allow the pair of arm supporters 600 to move, respectively.

For example, the arm supporter moving mechanism 480 includes a motor, a pinion connected to the motor, a rack engaged with the pinion, and a coupling body moving along the rack together with the pinion and the motor and coupled to the insertion portion 620 of the arm supporter 600.

The backrest 500 may be connected to the seat base 410 by the link 550. An upper end of the link 500 may be connected to the backrest 500, and a lower end may be connected to the seat base 410. The link 550 may have a curved shape so that a portion between the upper end and the lower end is curved backward.

A link connection portion 416 to which the link 550 is rotatably connected may be provided on the seat base 410. In more detail, the link connection portion 416 may be provided in a pair, which are spaced apart from each other in the left-right direction, and the lower end of the link 550 may be connected to a tilting shaft that is elongated in the left-right direction between the pair of link connection portions 416. Thus, the link 550 may be tilted forward and backward with respect to the seat 400.

The backrest 500 includes a back body 510, a connection body 520 coupled to the back body 510 and connected to a link 550, and a back pad 540 covering the back body 510 from the front side.

The back body 510 may include a case 511 defining an inner space S1 and an expansion portion 512 expanded from a circumference of the case 511.

A bottom surface of the case 511 may be opened. Also, at least a portion of a rear surface of the case 511 may be opened.

The connection body 520 may cover the opened rear surface of the case 511. Also, a portion of a lower side of the connection body 520 may be bent forward to provide a bent portion, and the bent portion may cover the opened bottom surface of the case 511.

That is, the connection body 520 may define the inner space S1 together with the case 511.

A link through-hole 523 through which the link 550 passes may be defined in the connection body 520. A portion of the link through-hole 523 may be defined in the bent portion. The link through-hole 523 may communicate with the inner space S1 of the case 511.

The link 550 may enter the inner space S1 through the link through-hole 523. That is, the upper end of the link 550 may be disposed in the inner space S1.

The expansion portion 512 may be expanded from left and right edges and an upper edge of the case 511. The expansion portion 512 may be integrated with the case 511.

The back pad 540 may cover the back body 510 from the front side. In more detail, the back pad 540 may cover the case 511 and the expansion portion 512 from the front side.

The back pad 540 may be made of a flexible material. As a result, the comfortable seating feeling may be provided to the user H that rides on the robot 100.

The backrest 500 may further include a frame 530 for coupling the connection body 520 to the back body 510. The back pad 540 may cover the frame 530 from the front side.

The frame 530 may be an approximately annular shape. The frame 530 may be coupled to the bent portion of the connection body 520 and may be coupled to the expansion portion 512 of the back body 510. The frame 530 may cover both edges and the upper edge of the expansion portion 512. As a result, the connection body 520 and the back body 510 may be firmly coupled to each other.

A first tilting mechanism 560 may be provided between the seat base 410 and the seat pad 440 to tilt the link 550. The link 550 may tilt around the tilting shaft connected to the link connection portion 416 of the seat base 410.

In more detail, a recess space 411 in which the first tilting mechanism 560 is disposed may be defined in the seat base 410. The recess space 411 may be recessed downward from the seat base 410. The recess space 411 may be lengthily defined in the front-rear direction. The recess space 411 may be opened at a rear end thereof.

The first tilting mechanism 560 disposed in the recess space 411 may be connected to the link 550 through the opened rear end of the recess space 411.

The first tilting mechanism 560 may include an actuator 561 that moves forward and backward. For example, the actuator 561 may be an electric hydraulic cylinder that is lengthily disposed in the front-rear direction.

The actuator 561 may include a cylinder 562 accommodated in the recess space 411 of the seat base 410 and a piston 563 moving forward and backward with respect to the cylinder 562.

A rear end of the piston 563 may protrude backward from the recess space 411 to push the lower end of the link 550 backward or pull the lower end of the link 550 forward. The rear end of the piston 563 may be rotatably connected to the lower end of the link 550.

When the piston 563 pushes the lower end of the link 550 backward, the link 550 and the backrest 500 may be tilted forward. When the piston 563 pulls the lower end of the link 550 forward, the link 550 and the backrest 500 may be tilted backward.

A front end of the cylinder 562 may be rotatably connected to the connector 564 installed in the recess space 411 of the seat base 510. In more detail, the front end of the cylinder 562 and the connector 564 may be connected to each other by a rotation shaft that is elongated in the left-right direction. As a result, the cylinder 562 and the piston 563 may rotate vertically with respect to the rotation axis, and the tilting range of the link 550 may increase.

A second tilting mechanism 570 that tilts the backrest 500 with respect to the link 550 may be embedded in the backrest 500. In more detail, the second tilting mechanism 570 may be disposed between the case 511 and the connection body 520.

An upper end of the link 550 may be rotatably connected to the connection body 520. In more detail, the upper end of the link 550 and the connection body 520 may be connected by the tilting shaft that is elongated in the left-right direction. The second tilting mechanism 570 may tilt the backrest 500 with respect to the tilting shaft.

For example, the second tilting mechanism 570 may include a connecting rod connected to the upper end of the link 550, a connector connected to an upper end of the connecting rod, and a motor connected to the connector.

Figure 22:
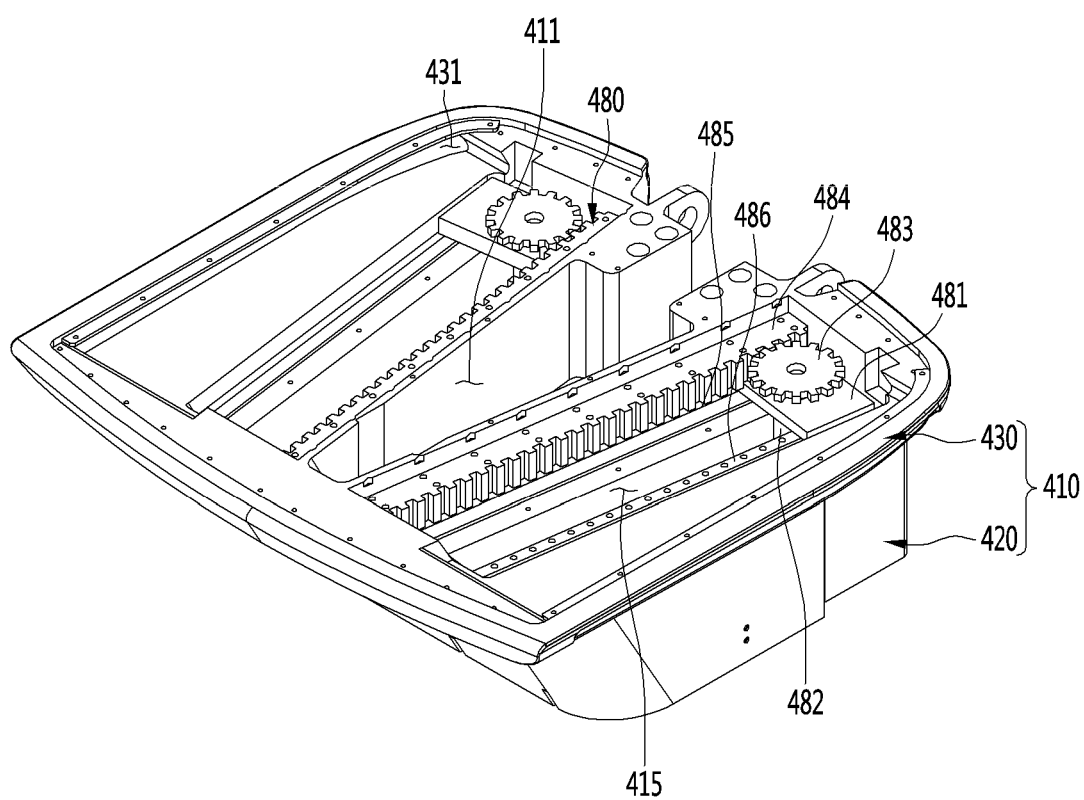
FIG. 22 illustrates a perspective view of a seat base and an arm supporter moving mechanism according to an embodiment.
Figure 23:
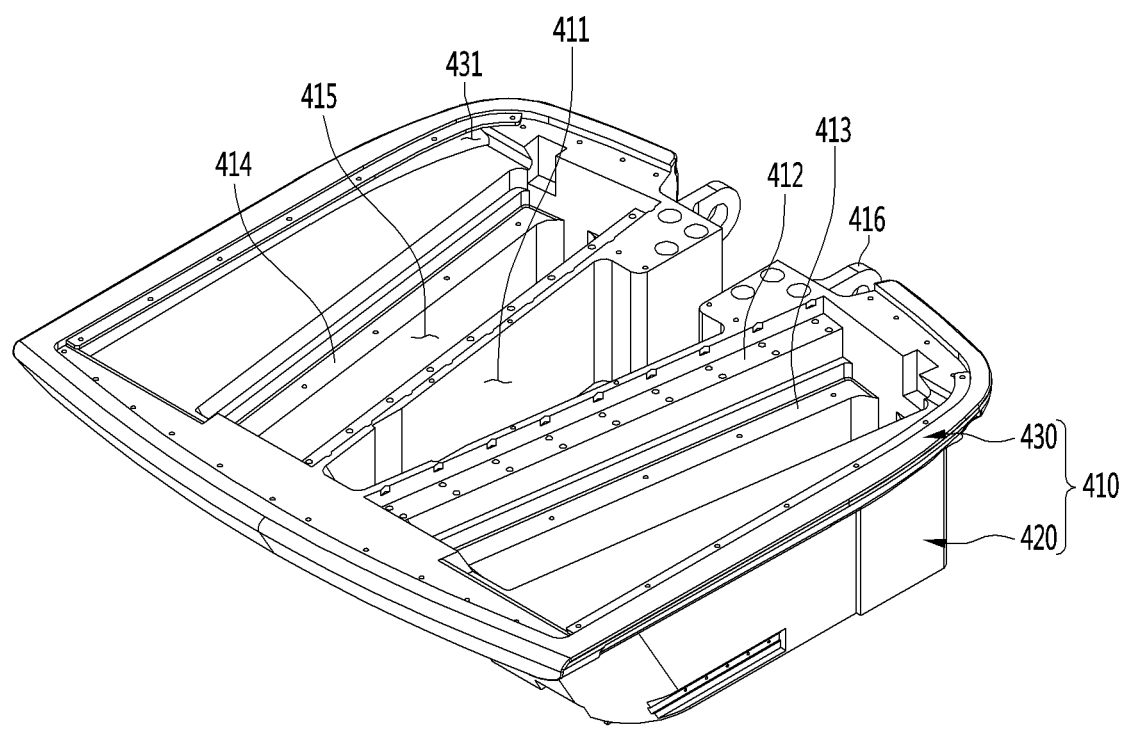
FIG. 23 illustrates a state in which the arm supporter moving mechanism of FIG. 22 is removed.
Figure 24:
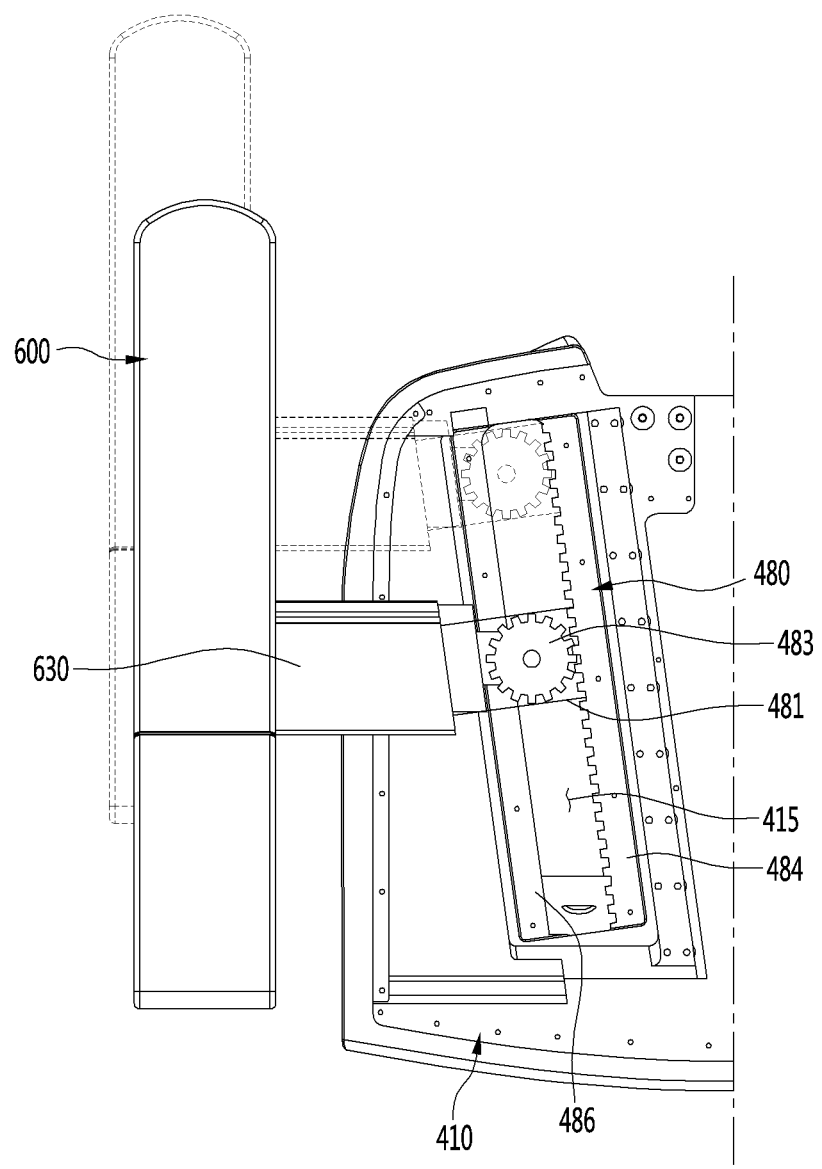
FIG. 24 illustrates a view for explaining an operation of the arm supporter moving mechanism according to an embodiment.

FIG. 22 illustrates a perspective view of the seat base and the arm supporter moving mechanism according to an embodiment, FIG. 23 illustrates a state in which the arm supporter moving mechanism of FIG. 22 is removed, and FIG. 24 illustrates a view for explaining an operation of the arm supporter moving mechanism according to an embodiment.

The arm supporter moving mechanism 480 may be provided in a pair, which allow the pair of arm supporters 600 to move, respectively. The pair of arm supporter moving mechanisms 480 may be symmetrical to each other with respect to the recess space 411.

Each of the arm supporter moving mechanisms 480 may include a coupling body 481, a motor 482, a pinion 483, and a rack 484. The arm supporter moving mechanism 480 may further include guide rails 485 and 486.

The coupling body 481 may be coupled to the arm supporter 600. In more detail, the coupling body 481 may be coupled to an end of the insertion portion 630 inserted into the long hole 431. Thus, the arm supporter 600 may move together with the coupling body 481.

The motor 482 may be disposed so that the rotation shaft is lengthily disposed vertically. The pinion 483 may be disposed at a side that is opposite to the motor 482 with respect to the coupling body 481. For example, the motor 482 may be disposed below the coupling body 481, and the pinion 483 may be disposed above the coupling body 481.

The motor 482 may be connected to the pinion 483 through the coupling body 481. Thus, the motor 482 and pinion 483 may move together with the coupling body 483.

The pinion 483 may be disposed horizontally. The pinion 483 may rotate by the motor 482.

The rack 484 may be engaged with the pinion 483. In more detail, the inner surface of the rack 484 may face the direction in which the recess space 411 is disposed, and the gear engaged with the pinion 483 may be disposed on the outer surface of the rack 484. Accordingly, the pinion 483 may move along the length of the rack 484, and the pinion 483 may move together with the motor 482, the coupling body 481, and the arm supporter 600.

The rack 484 may be disposed to be approximately elongated in the front-rear direction. The left-right distance between the rack 484 of one moving mechanism 480 and the rack 484 of the other moving mechanism 480 may gradually decrease forward. Also, the rack 484 of one moving mechanism 480 and the rack 484 of the other moving mechanism 480 may be symmetrical to each other.

As a result, when the pair of arm supporters 600 move forward, the left-right distance between the pair of arm supporters 600 may gradually decrease. On the other hand, when the pair of arm supporters 600 move backward, the left-right distance between the pair of arm supporters 600 may gradually increase.

The guide rails 485 and 486 may guide the movement of the coupling body 481. The guide rails 485 and 486 may be elongated in a direction parallel to the rack 484.

The guide rails 485 and 486 may be disposed below the coupling body 481 and may support the coupling body 481. The bottom surface of the coupling body 481 may be provided with a slider that is slid along the guide rails 485 and 486.

The guide rails 485 and 486 may include an inner rail 485 and an outer rail 486.

The inner rail 485 and the outer rail 486 may be spaced apart from each other in parallel. The inner rail 485 may support an inner end of the coupling body 481, and the outer rail 486 may support an outer end of the coupling body 481.

The motor 482 may be disposed between the inner rail 485 and the outer rail 486 in the horizontal direction. The motor 482 may move along a gap between the inner rail 485 and the outer rail 486.

The inner rail 485 may be disposed below the rack 484. In more detail, the inner rail 485 may be spaced downward from the rack 484. That is, the inner end of the coupling body 481 may be disposed between the rack 484 and the inner rail 485 in the vertical direction. As a result, the rack 484 may restrict the coupling body 481 with respect to the upper side.

The seat base 410 may have an opening space 415 in which the motor 482 is accommodated. The opening space 415 may be opened with respect to the upper side.

The opening space 415 may include a space between the inner rail 485 and the outer rail 486. That is, the motor 482 may be disposed between the inner rail 485 and the outer rail 486.

The opening space 415 may be provided in a pair that are symmetrical to each other with respect to the recess space 411.

The opening space 415 may be elongated in a direction parallel to the rack 484. In more detail, the opening space 415 disposed at one side of the recess space 411 may be parallel to the rack 484 disposed at one side of the recess space 411, and the opening space 415 disposed at the other side of the recess space 411 may be parallel to the rack 484 disposed at the other side of the recess space 411.

The seat base 410 may have a rack seating portion 412 on which the rack 484 is seated. The rack seating portion 412 may be stepped downward with respect to a top surface of the seat base 410.

The rack seating portion 412 may be disposed outside the recess space 411 and may be spaced apart from the recess space 411.

An inner rail seating portion 413 on which the inner rail 485 is seated may be disposed on the seat base 410. The inner rail seating portion 413 may be disposed outside the rack seating portion 412. The inner rail seating portion 413 may be provided to be stepped downward with respect to the rack seating portion 412.

The outer rail seating portion 414 may be disposed on the seat base 410 on which the outer rail 486 is seated. The outer rail seating portion 414 may be disposed outside the inner rail seating portion 413. The outer rail seating portion 414 may be disposed at the same height as the inner rail seating portion 413.

The outer rail seating portion 414 and the inner rail seating portion 413 may be disposed at both sides of the opening space 415, respectively. The opening space 415 may be recessed downward from the outer rail seating portion 414 and the inner rail seating portion 413.

Each of the rack seating portion 412, the inner rail seating portion 413, and the outer rail seating portion 414 may be provided in a pair, which are symmetric to each other in the left-right direction with respect to the recess space 411.

Each of the rack seating portion 412, the inner rail seating portion 413, and the outer rail seating portion 414 may be elongated in the direction parallel to the rack 484. In more detail, each of the rack seating portion 412, the inner rail seating portion 413, and the outer rail seating portion 414, which are disposed on one side of the recess space 411 may be parallel to the rack 484 disposed on one side of the recess space 411. Each of the rack seating portion 412, the inner rail seating portion 413, and the outer rail seating portion 414, which are disposed on the other side of the recess space 411 may be parallel to the rack 484 disposed on the other side of the recess space 411.

Hereinafter, an operation of the arm supporter moving mechanism 480 will be described.

The pair of arm supporter moving mechanisms 480 may operate simultaneously. In more detail, the pair of arm supporter moving mechanisms 480 may allow the pair of arm supporters 600 to move forward or simultaneously backward. Also, the pair of arm supporter moving mechanisms 480 may allow the pair of arm supporters 600 to move at the same speed. Therefore, the pair of arm supporters 600 may be maintained to be symmetrical to each other in the left-right direction.

However, this embodiment is not limited thereto, and the pair of arm supporter moving mechanisms 480 may allow the pair of arm supporters 600 to move independently.

When the motor 482 allows the pinion 483 to rotate in one direction, the motor 482, the pinion 483, and the coupling body 481 may move forward along the rack 484. Here, the coupling body 481 may be supported by the inner rail 485 and the outer rail 486, the movement of the coupling body 481 may be guided. Also, the motor 481 may pass between the inner rail 485 and the outer rail 486 to maintain the state in which the motor 481 is disposed in the opening space 415 and then move forward. The insertion portion 630 of the arm supporter 600 may move forward while maintaining the state of being inserted into the long hole 431.

As a result, the arm supporter 600 coupled to the coupling body 481 may move forward. As illustrated in FIG. 13B, the arm supporter 600 may move forward to a first position M1.

On the other hand, if motor 482 allows the pinion 483 to rotate in the opposite direction, the motor 482, the pinion 483, and the coupling body 481 may move backward along rack 484. Here, the coupling body 481 may be supported by the inner rail 485 and the outer rail 486, the movement of the coupling body 481 may be guided. Also, the motor 481 may pass between the inner rail 485 and the outer rail 486 to maintain the state in which the motor 481 is disposed in the opening space 415 and then move backward. The insertion portion 630 of the arm supporter 600 may move backward in the state of being inserted into the long hole 431.

As a result, the arm supporter 600 coupled to the coupling body 481 may move backward. As illustrated in FIG. 13C, the arm rest 600 may move backward to a second position M2.

Since the arm supporter 600 moves along a longitudinal direction of the rack 484, the pair of arm supporters 600 may move away from each other as moving backward. In more detail, a left-right distance D2 between the pair of arm supporters when the pair of arm supporters 600 are disposed at the second position M2 is greater than a left-right distance D2 between the pair of arm supporters when the pair of arm supporters 600 are disposed at the first position M1.

Just before the user H rides on the robot 100, the pair of arm supporters 600 may move to the second position M2, and the distance between the pair of arm supporters 600 may be farther away. As a result, the user H may be easily seated on the seat 400 without being disturbed by the arm supporter 600.

After the user H rides, the user H may allow the arm supporter 600 to move to a position at which the user is comfortably seated.

According to the embodiment, the arm supporter may move forward and backward to fit the user's body shape. As a result, the user's riding comfort may be improved.

In addition, the arm supporter moving mechanism may be disposed between the seat base and the seat pad. As a result, the exposure of the arm supporter moving mechanism to the outside may be minimized so that the arm supporter moving mechanism is protected.

Also, the arm supporter moving mechanism may allow the arm supporter to move with respect to the seat even if the seat is elevated with respect to the body or is inclined with respect to the body for leveling.

Also, the seat base may be inserted into the opening portion defined in the top surface of the main body and cover the opening portion. As a result, the outer appearance of the robot may be improved in design, and the robot may be compact vertically.

Also, the motor may be connected to the pinion through the coupling body coupled to the arm supporter. Thus, the motor, the coupling body, and the arm supporter may move together with the pinion. As a result, the arm supporter may smoothly move along the longitudinal direction of the rack.

Also, the left-right distance between the rack of one moving mechanism and the rack of the other moving mechanism may gradually decrease forward. Thus, as the pair of arm supporters moves backward, the left-right distance between the pair of arm supporters may be gradually farther away. Thus, the left-right distance between the pair of arm supporters may be adjusted.

Also, just before the user rides, since the distance between the pair of arm supporters increases, the user may be easily seated on the seat without being disturbed by the arm supporter.

Also, the coupling body may be supported by the inner rail and the outer rail, and the movement of the coupling body may be guided.

Also, the motor may be disposed between the inner rail and the outer rail with respect to the horizontal direction. Thus, the seat may be compact vertically.

Also, the inner end of the coupling body may be disposed between the rack and the inner rail in the vertical direction. Thus, the coupling body may be prevented from being separated upward, and thus, the seat may be compact in the horizontal direction.

Also, the long hole through which each of the arm supporters passes may be defined in each of both sides of the seat base. Thus, the movement of the arm supporter may be guided, and the arm supporter may be prevented from swinging vertically.

The seat may also be provided with the recess space in which the tilting mechanism for tilting the backrest is accommodated. This may allow the tilting mechanism to tilt the backrest with respect to the seat even if the seat is elevated with respect to the body or tilted with respect to the body for leveling.

Also, the pair of arm supporter moving mechanisms may be symmetrical to each other with respect to the recess space. Thus, the pair of arm supporter moving mechanisms and tilting mechanisms may be efficiently disposed on the seat.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the disclosure but by the appended claims, and all differences within the scope will be construed as being included in the present disclosure.

What is claimed is:

1. A robotic wheelchair robot comprising:
a main body provided with a traveling wheel;
a seat base coupled to an upper portion of the main body;
a seat pad configured to cover the seat base at an upper side of the seat base;
a pair of arm supporters connected to both sides of the seat base, respectively; and
a pair of moving mechanisms disposed between the seat base and the seat pad, the pair of moving mechanisms being configured to allow the pair of arm supporters to move forward and backward,
wherein each of the moving mechanisms comprises:
a motor;
a pinion connected to the motor;
a rack engaged with the pinion; and
a coupling body coupled to each of the arm supporters, the coupling body being configured to move in a longitudinal direction of the rack together with the motor and the pinion.

2. The robotic wheelchair according to claim 1, wherein the motor is connected to the pinion by passing through the coupling body.

3. The robotic wheelchair according to claim 1, wherein the motor and the pinion are disposed at opposite sides with respect to the coupling body.

4. The robotic wheelchair according to claim 1, wherein a left-right distance between the rack of one moving mechanism and the rack of the other moving mechanism gradually decreases forward.

5. The robotic wheelchair according to claim 1, wherein the rack of one moving mechanism and the rack of the other moving mechanism are symmetrical to each other in a left-right direction.

6. The robotic wheelchair according to claim 1, wherein an opening space in which the motor is accommodated and which is opened upward is defined in the seat base, and
wherein the opening space is lengthily defined in a direction parallel to the rack.

7. The robotic wheelchair according to claim 1, wherein the moving mechanism further comprises:
an inner rail configured to support an inner end of the coupling body; and
an outer rail parallely spaced apart from the inner rail, the outer rail being configured to support an outer end of the coupling body.

8. The robotic wheelchair according to claim 7, wherein the motor is disposed between the inner rail and the outer rail in a horizontal direction.

9. The robotic wheelchair robot according to claim 7, wherein the rack is spaced upward from the inner rail, and
wherein the inner end of the coupling body is disposed between the rack and the inner rail in a vertical direction.

10. The robotic wheelchair according to claim 1, wherein a long hole through which each of the arm supporters passes is defined in each of both sides of the seat base.

11. The robotic wheelchair robot according to claim 10, wherein each of the arm supporters comprises:
an armrest that is elongated forward and backward;
an insertion portion inserted into the long hole; and
a connection portion configured to connect the armrest to the insertion portion.

12. The robotic wheelchair according to claim 1, further comprising:
a backrest connected to the seat base; and
a tilting mechanism embedded in the seat, the tilting mechanism being configured to tilt the backrest with respect to the seat base,
wherein a recess space in which the tilting mechanism is accommodated is defined in the seat base, and
the pair of moving mechanisms are symmetrical to each other in a left-right direction with respect to the recess space.

13. The robotic wheelchair according to claim 1, wherein the moving mechanism is configured to allow each of the arm supporters to move between a first position and a second position that is disposed behind the first position, and
wherein a left-right distance between the pair of arm supporters that are disposed at the first positions is less than a left-right distance between the pair of arm supporters that are disposed at the second positions.

14. A robotic wheelchair comprising:
a main body provided with a traveling wheel;
a seat base coupled to an upper portion of the main body;
a seat pad configured to cover the seat base at an upper side of the seat base;
a pair of arm supporters connected to both sides of the seat base, respectively; and
a pair of moving mechanisms disposed between the seat base and the seat pad, the pair of moving mechanisms being configured to allow the pair of arm supporters to move forward and backward
wherein the seat base comprises:
a lower base inserted into the main body through an opening portion defined in a top surface of the main body; and
an upper base which is connected to an upper portion of the lower base and is configured to cover the opening portion and in which a long hole through which the arm supporter passes is defined.

15. A robotic wheelchair comprising:
a main body provided with a traveling wheel;
a seat disposed above the main body;
a pair of arm supporters connected to both sides of the seat, respectively; and
a pair of moving mechanisms embedded in the seat, the pair of moving mechanisms being configured to allow each of the pair of arm supporters to move between a first position and a second position that is disposed behind the first position,
wherein a left-right distance between the pair of arm supporters that are disposed at the first positions is less than a left-right distance between the pair of arm supporters that are disposed at the second positions, and
wherein each of the moving mechanisms comprises:
a motor;
a pinion connected to the motor;
a rack engaged with the pinion; and
a coupling body coupled to each of the arm supporters, the coupling body being configured to move in a longitudinal direction of the rack together with the motor and the pinion.

16. The robotic wheelchair according to claim 15, wherein the seat comprises:
a seat base in which the moving mechanisms are accommodated; and
a seat pad configured to cover the seat base and the moving mechanisms at an upper side of each of the seat base and the moving mechanisms.

17. The robotic wheelchair robot according to claim 15, wherein the moving mechanism further comprises:
an inner rail configured to support an inner end of the coupling body; and
an outer rail parallely spaced apart from the inner rail, the outer rail being configured to support an outer end of the coupling body.

18. The robotic wheelchair according to claim 17, wherein the rack is spaced upward from the inner rail, and
wherein the inner end of the coupling body is disposed between the rack and the inner rail in a vertical direction.

* * * * *